(12) United States Patent
Hasegawa et al.

(10) Patent No.: US 10,887,142 B2
(45) Date of Patent: Jan. 5, 2021

(54) TRANSMITTER, RECEIVER, COMMUNICATION SYSTEM, AND TRANSMISSION METHOD

(71) Applicant: Mitsubishi Electric Corporation, Tokyo (JP)

(72) Inventors: Fumihiro Hasegawa, Tokyo (JP); Akihiro Okazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/486,100

(22) PCT Filed: Mar. 9, 2017

(86) PCT No.: PCT/JP2017/009512
§ 371 (c)(1),
(2) Date: Aug. 14, 2019

(87) PCT Pub. No.: WO2018/163359
PCT Pub. Date: Sep. 13, 2018

(65) Prior Publication Data
US 2020/0235970 A1    Jul. 23, 2020

(51) Int. Cl.
*H04L 27/26* (2006.01)
*H04L 27/01* (2006.01)
*H04L 27/36* (2006.01)

(52) U.S. Cl.
CPC .......... *H04L 27/2602* (2013.01); *H04L 27/01* (2013.01); *H04L 27/2608* (2013.01); *H04L 27/36* (2013.01)

(58) Field of Classification Search
CPC . H04L 27/2636; H04L 27/2602; H04L 27/01; H04L 27/2608; H04L 27/36; H04J 13/0059; H04B 1/707
(Continued)

(56) References Cited

U.S. PATENT DOCUMENTS

| | | | | |
|---|---|---|---|---|
| 2014/0269249 A1* | 9/2014 | Bai | ....................... | H04L 1/0003 370/204 |
| 2016/0036615 A1* | 2/2016 | Hasegawa | ............. | H04L 27/362 370/329 |
| 2018/0091983 A1 | 3/2018 | Hasegawa | | |

FOREIGN PATENT DOCUMENTS

| | | |
|---|---|---|
| JP | 2010-034672 A | 2/2010 |
| WO | WO 2017/022056 A1 | 2/2017 |

OTHER PUBLICATIONS

"Static Sequence Assisted Out-of-Band Power Suppression for DFT-s-OFDM", Hasegawa et al. (hereinafter, referred to as Hasegawa) (Published in: 2015 IEEE 26th Annual International Symposium on Personal, Indoor, and Mobile Radio Communications (PIMRC), Date of Conference: Aug. 30-Sep. 2, 2015). (Year: 2015).*

(Continued)

*Primary Examiner* — Leila Malek
(74) *Attorney, Agent, or Firm* — Birch, Stewart, Kolasch & Birch, LLP

(57) ABSTRACT

The present invention is a transmitter compatible with a multicarrier block transmission scheme. The transmitter includes: a fixed sequence generation unit that generates a fixed sequence; a data sequence generation unit that converts data symbols into a time domain signal to generate a data signal; a multiplexing unit that divides the fixed sequence into two divisions, places one of the two divisions at the head and another one of the two divisions at the tail of a block, and places a data sequence that is an output signal from the data sequence generation unit between the two divisions to generate a block signal; and an interpolation unit that performs interpolation processing on the block signal.

26 Claims, 16 Drawing Sheets

(58) Field of Classification Search
USPC .......................................................... 375/260
See application file for complete search history.

(56) References Cited

OTHER PUBLICATIONS

Extended European Search Report issued in corresponding European Application No. 17899278.0 dated Feb. 21, 2020.
Mitsubishi Electric: "UW DFTs0FDM performance evaluation above 40 GHz", 3GPP Draft; R1-1700649-RAN1AH1701-UWDFTSOFDM_ABOVE40GHZ_MITSUBISHI, 3rd Generation Partnership Project (3GPP), Mobile Competence Centre; vol. RAN WG1, No. Spokane, WA; Jan. 16, 2017.
Chu, "Polyphase Codes With Good Periodic Correlation Properties", IEEE Transactions on Information Theory, Jul. 1972, pp. 531-532.
Liu et al., "Iterative MAP Equalization and Decoding in Wireless Mobile Coded OFDM", IEEE Transactions on Communications, vol. 57, No. 7, Jul. 2009, pp. 2042-2051.
Porat, "A Course in Digital Signal Processing", John Wiley & Sons, Inc., 1997, 3 pages.
Zou et al., "COFDM: An Overview", IEEE Transactions on Broadcasting, vol. 41, No. 1, Mar. 1995, pp. 1-8.

\* cited by examiner

TRANSMITTER, RECEIVER, COMMUNICATION SYSTEM, AND TRANSMISSION METHOD

FIELD

The present invention relates to a transmitter that transmits digital signals, a receiver, a communication system, and a transmission method.

BACKGROUND

In a digital communication system, multipath fading that occurs when a transmission signal is reflected by a building or the like or the Doppler shift that occurs due to the movement of a communication device results in frequency selectivity and time variability on the transmission path. In a multipath environment where multipath fading occurs, a communication device receives a signal in which transmission symbols delivered directly from the source communication device interfere with symbols reflected by a building or the like and delivered late.

On a transmission path with frequency selectivity, an orthogonal frequency division multiplexing (OFDM) transmission scheme for multicarrier (multiple carrier, MC) block transmission (for example, refer to Non Patent Literature 1 below) can be used in order to obtain the best reception characteristics.

CITATION LIST

Non Patent Literature

Non Patent Literature 1: W. Y. Zou and Y. Wu, "COFDM: AN OVERVIEW", IEEE Trans. on Broadcasting, vol. 41, no. 1, March 1995, pp. 1-8.

SUMMARY

Technical Problem

The OFDM transmission scheme has a problem: phase discontinuity occurs between blocks, which increases the out-of-band power of the transmission signal. The OFDM transmission system has another problem: a reference signal necessary for performing processing such as transmission path estimation and block synchronization is inserted into a block, which results in reduced transmission efficiency.

The present invention has been made in view of the above, and an object thereof is to obtain a transmitter capable of suppressing out-of-band power and improving transmission efficiency.

Solution to Problem

An aspect of the present invention is a transmitter compatible with a multicarrier block transmission scheme, and the transmitter includes a fixed sequence generation unit that generates a fixed sequence and a data sequence generation unit that converts data symbols into a time domain signal to generate a data signal. The transmitter also includes a multiplexing unit that divides the fixed sequence into two divisions, places one of the two divisions at the head and another one of the two divisions at the tail of a block, and places a data sequence that is an output signal from the data sequence generation unit between the two divisions to generate a block signal, and an interpolation unit that performs interpolation processing on the block signal.

Advantageous Effects of Invention

The transmitter according to the present invention can achieve the effect of suppressing out-of-band power and improving transmission efficiency.

DESCRIPTION OF EMBODIMENTS

Hereinafter, a transmitter, a receiver, a communication system, and a transmission method according to embodiments of the present invention will be described in detail based on the drawings. The present invention is not limited to the embodiments.

First Embodiment

Figure 1:
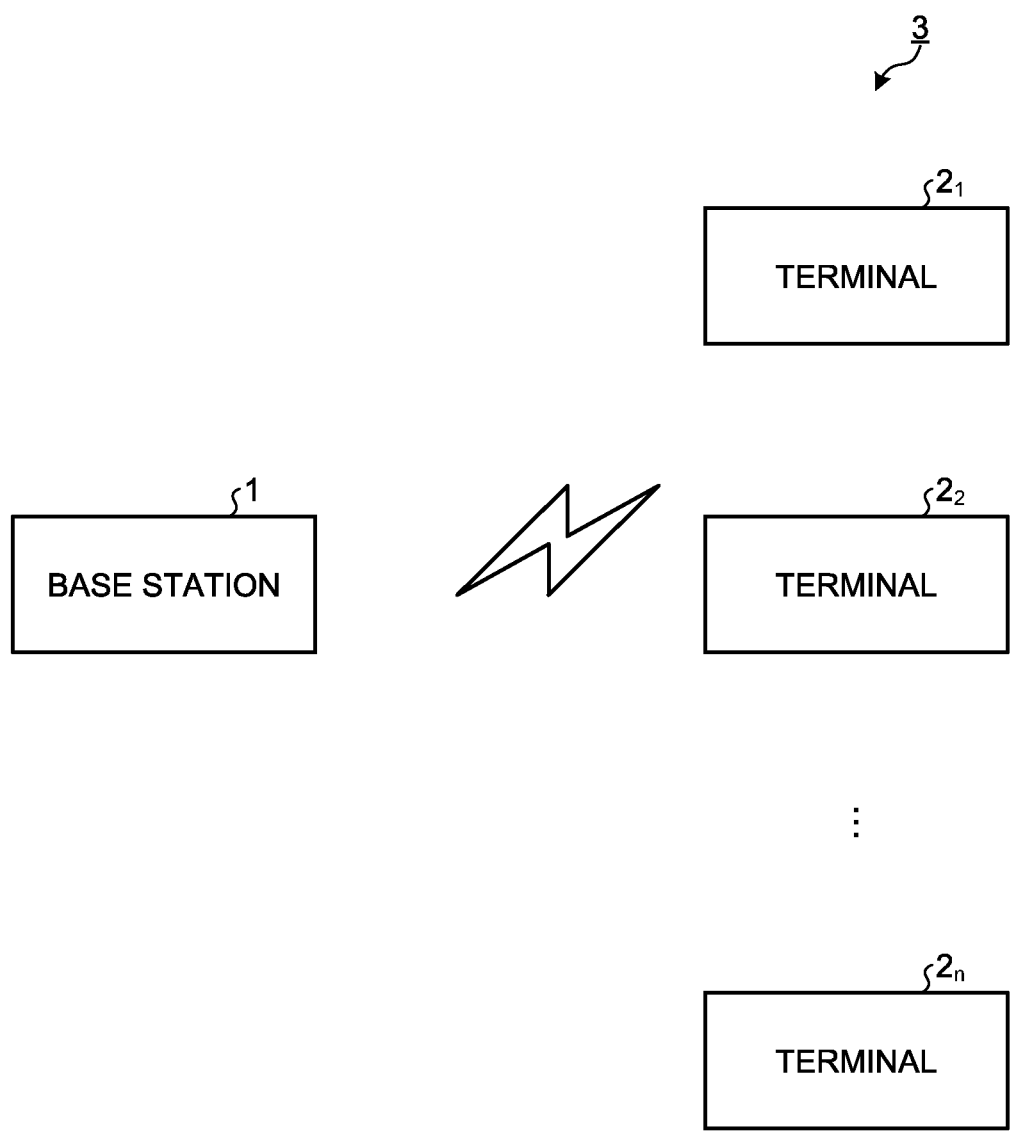
FIG. 1 is a diagram illustrating an exemplary configuration of a communication system according to a first embodiment.

FIG. 1 is a diagram illustrating an exemplary configuration of a communication system according to a first embodiment of the present invention. A communication system 3 according to the first embodiment includes a base station 1 and a plurality of terminals $2_1$ to $2_n$. In the following description, when there is no need to distinguish between the plurality of terminals $2_1$ to $2_n$, they are referred to as the terminals 2.

The terminal 2 is a communication device that is also called a user terminal or user equipment (UE). The transmission path from the base station 1 to the terminal 2 is called a downlink, and the transmission path from the terminal 2 to the base station 1 is called an uplink. In downlink communication, the base station 1 is a transmitter and the terminal 2 is a receiver. In uplink communication, the terminal 2 is a transmitter and the base station 1 is a receiver. In the communication system 3 according to the present embodiment, an OFDM scheme is used for downlink communication. There is no restriction on the communication scheme for uplink communication. As long as necessary information can be transmitted from the terminal 2 to the base station 1, any communication scheme may be used for uplink communication. The following description refers mainly to downlink communication. Therefore, in the following description, the base station 1 is a transmitter and the terminal 2 is a receiver.

Figure 2:
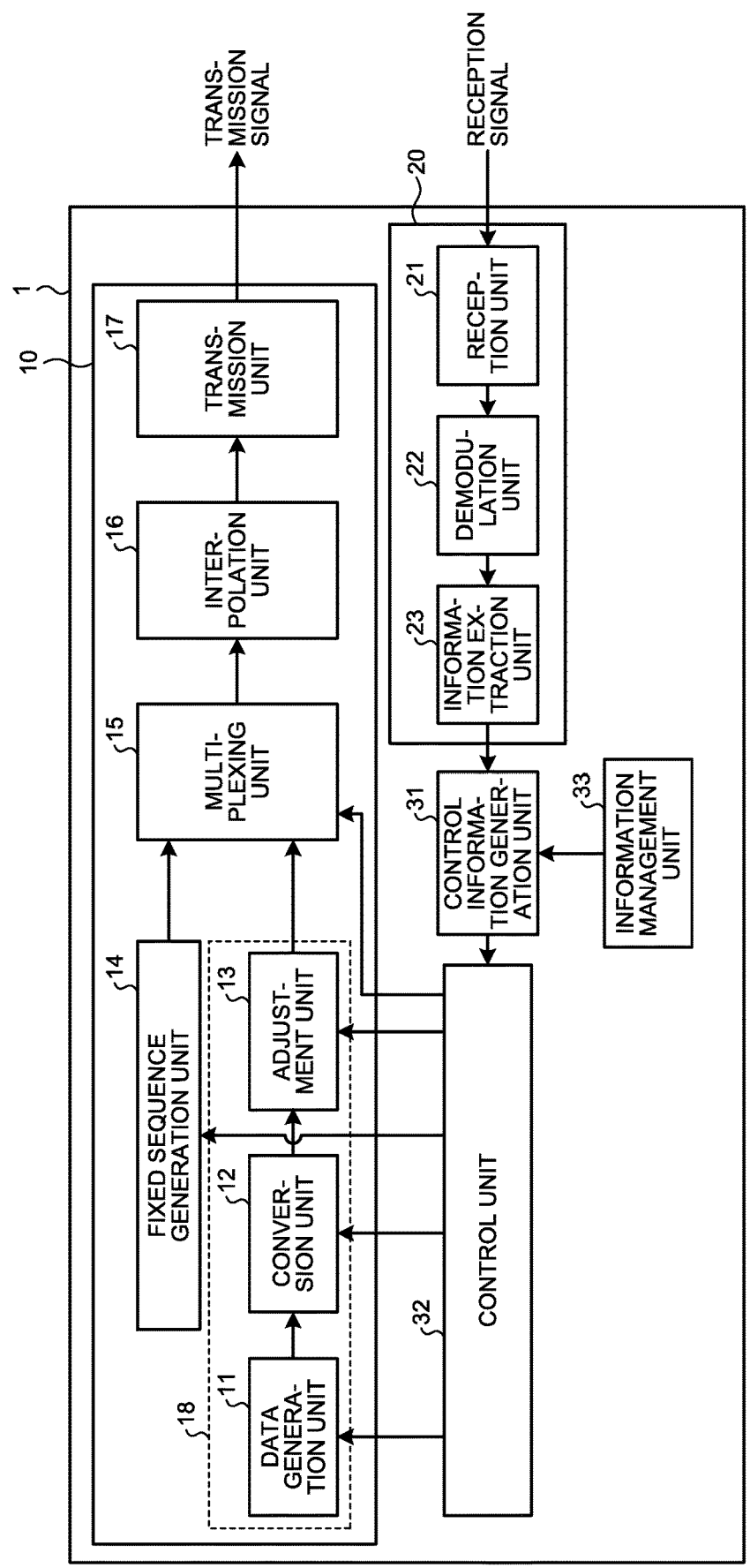
FIG. 2 is a diagram illustrating an exemplary configuration of a base station according to the first embodiment.

FIG. 2 is a diagram illustrating an exemplary configuration of the base station 1 according to the first embodiment. The base station 1 includes a data generation unit 11, a conversion unit 12, an adjustment unit 13, a fixed sequence generation unit 14, a multiplexing unit 15, an interpolation unit 16, a transmission unit 17, a reception unit 21, a demodulation unit 22, an information extraction unit 23, a control information generation unit 31, a control unit 32, and an information management unit 33. The data generation unit 11, the conversion unit 12, the adjustment unit 13, the fixed sequence generation unit 14, the multiplexing unit 15, the interpolation unit 16, and the transmission unit 17 constitute a transmitter 10. The data generation unit 11, the conversion unit 12, and the adjustment unit 13 constitute a data sequence generation unit 18. The reception unit 21, the demodulation unit 22, and the information extraction unit 23 constitute a receiver 20.

The data generation unit 11 generates data symbols based on an information sequence that is transmitted to the terminal 2. The data generation unit 11 generates data symbols such as, for example, phase shift keying (PSK) symbols or quadrature amplitude modulation (QAM) symbols. The information sequence may be subjected to error correction processing before being used for generating data symbols. The information sequence that is transmitted to the terminal 2 can include control information. The conversion unit 12 converts the data symbols generated by the data generation unit 11 into a time domain signal to generate a data signal which is a multicarrier signal. An output signal from the conversion unit 12 is an input signal to the adjustment unit 13.

The adjustment unit 13 adjusts the time domain signal input from the conversion unit 12 such that it has the signal length designated by the control unit 32. The adjustment unit 13 adjusts the length of the time domain signal by reducing the number of samples of the time domain signal. The process in which the adjustment unit 13 adjusts the length of the time domain signal will be described later. Note that when the signal length designated by the control unit 32 is equal to the length of the input time domain signal, the adjustment unit 13 does not perform the process of reducing the number of samples of the signal. Instead of the length of the adjusted time domain signal, the control unit 32 may notify the adjustment unit 13 of the number of samples to be reduced from the input time domain signal. An output signal from the adjustment unit 13 is an input signal to the multiplexing unit 15. Hereinafter, the time domain signal output from the adjustment unit 13 is referred to as a data sequence.

The fixed sequence generation unit 14 generates a fixed sequence including a plurality of fixed symbols to be inserted into a transmission signal. The fixed symbols have a predetermined signal value. The fixed sequence may be any sequence. For example, the fixed sequence can be a zero sequence consisting of zero symbols. Alternatively, the fixed sequence can be a sequence described in the literature "D. C. Chu, 'Polyphase Codes With Good Periodic Correlation Properties', IEEE Transactions on Information Theory, vol. 18, no. 4, July 1972, pp. 531-532" (hereinafter referred to as the D. C. Chu literature).

An output signal from the fixed sequence generation unit 14 is an input signal to the multiplexing unit 15. The multiplexing unit 15 places the output of the fixed sequence generation unit 14 and the output of the adjustment unit 13 in a block including a prescribed number of transmission symbols to generate a block signal. In the following description, the block signal output from the multiplexing unit 15 is referred to as the block X. The block X has a length of N samples. Therefore, the sum of the length of the fixed sequence output from the fixed sequence generation unit 14 and the length of the data sequence output from the adjustment unit 13 is N samples. The data sequence output from the adjustment unit 13 has a length of M samples, and the fixed sequence output from the fixed sequence generation unit 14 has a length of T=N-M (samples). The multiplexing unit 15 divides the input fixed sequence into two divisions and places the two divisions at the both ends in the block X, correspondingly. The two fixed sequences obtained by dividing the input fixed sequence (hereinafter, also referred to as "two divisions") may each have any length. For example, the two divisions may have the same length, that is, both divisions may have a length of T/2. Alternatively, the two divisions may have different lengths, that is, either of the two may have a length of $T_1$ and the other may have a length of $T_2$, where $T=T_1+T_2$ and $T_1 \ne T_2$ are satisfied. The multiplexing unit 15 places the data sequence input from the adjustment unit 13 in the middle of the block X, that is, between the two divisions of the fixed sequence.

Here, the process in which the adjustment unit 13 adjusts the length of the time domain signal will be described. The adjustment unit 13 adjusts the length of the time domain signal using a digital filter or the like. For example, the process of replacing a certain number of samples at both ends with zeros can be performed as an example of a filtering process for adjusting the length (N samples) of the signal $y=[y_0, y_1, y_2, \ldots, y_{N-1}]^T$. In this case, the data sequence, i.e. the filtered signal y', is represented by Formula (1). The adjustment unit 13 outputs the samples other than the certain number of samples at both ends, namely the zero samples, to the multiplexing unit 15.

[Formula 1]

$$y' = \left[0, \ldots, 0, y_{\frac{T}{2}}, y_{\frac{T}{2}+1}, \ldots, y_{N-\frac{T}{2}-1}, 0, \ldots, 0\right]^T \quad (1)$$

For example, in a case where N=8, M=4, and $T_1=T_2=2$ are satisfied, the filtered data sequence is y'=[0, 0, $y_2$, $y_3$, $y_4$, $y_5$, $[0, 0]^T$. Note that the adjustment unit 13 need not change the length of the signal. In this case, the length of the input signal to the adjustment unit 13 is equal to the length of the output signal from the adjustment unit 13, and the output signal to the multiplexing unit 15 includes zeros at both ends. The multiplexing unit 15 deletes the zeros at both ends of the input signal, and adds the two divisions of the fixed sequence to the both ends, correspondingly.

The length by which the fixed sequence is divided, that is, the lengths of the two divisions of the fixed sequence, and the length T of the original fixed sequence may be determined based on the maximum delay time on the multipath transmission path and the desired amount of suppression of out-of-band power. The maximum delay time on the multipath transmission path is the maximum value of the delay time that is added, on the transmission path, to a signal transmitted by the transmitter 10 to the terminal 2. For example, in a case where the length T of the original fixed sequence is determined based on the maximum delay time, the terminal 2 that is a receiver measures the maximum delay time and feeds it back to the base station 1. The base station 1 determines the fixed sequence length T that is longer than the fed back maximum delay time. The amount of suppression of out-of-band power is determined by the ratio of the lengths of the two divisions of the fixed sequence, that is, the ratio of $T_1$ and $T_2$. Therefore, the base station 1 determines the lengths $T_1$ and $T_2$ having a ratio that can achieve the desired amount of suppression. In the base station 1, the control unit 32, the control information generation unit 31, or a higher layer determines the length by which the fixed sequence is divided and the fixed sequence length T. The control unit 32 gives operation instructions to the fixed sequence generation unit 14, the adjustment unit 13, and the multiplexing unit 15 based on the determination result. The control unit 32 notifies the fixed sequence generation unit 14 of the length T of the fixed sequence to be generated, notifies the adjustment unit 13 of the length of the data sequence to be output, and notifies the multiplexing unit 15 of the lengths $T_1$ and $T_2$ of the two divisions of the fixed sequence. The control unit 32 may notify the multiplexing unit 15 of the length of either of the two divisions of the fixed sequence or the ratio of the lengths of the two divisions of the fixed sequence. Note that the base station 1 informs the terminal 2 using a control channel or the like of the type of sequence to be used as the fixed sequence, the value of the fixed sequence, the ratio of $T_1$ and $T_2$, and the value of T. The control channel is a channel that the base station 1 uses when transmitting, to the terminal 2, control information necessary for demodulating data signals and other control information. Control information is transmitted to the terminal 2 using a dedicated symbol or subcarrier. For example, in the 3rd Generation Partnership Project (3GPP) Long Term Evolution (LTE) standards, the Physical Downlink Control Channel (PDCCH) or the like is used as a control channel for transmitting control information from the base station 1 to the terminal 2.

Below is a specific example of the block X that the multiplexing unit 15 outputs. Suppose the output of the fixed sequence generation unit 14 is $p_0, p_1, \ldots, p_{T-1}$, and the output of the adjustment unit 13 is $s_0, s_1, \ldots, s_{M-1}$. Then, suppose the multiplexing unit 15 divides the input fixed sequence into two divisions having the same length. In this case, the block X is represented by Formula (2).

[Formula 2]

$$p_0, p_1, \ldots, p_{\frac{T}{2}-1}, s_0, s_1, \ldots, s_{M-1}, p_{\frac{T}{2}}, p_{\frac{T}{2}+1}, \ldots, p_{T-1} \quad (2)$$

Figure 3:
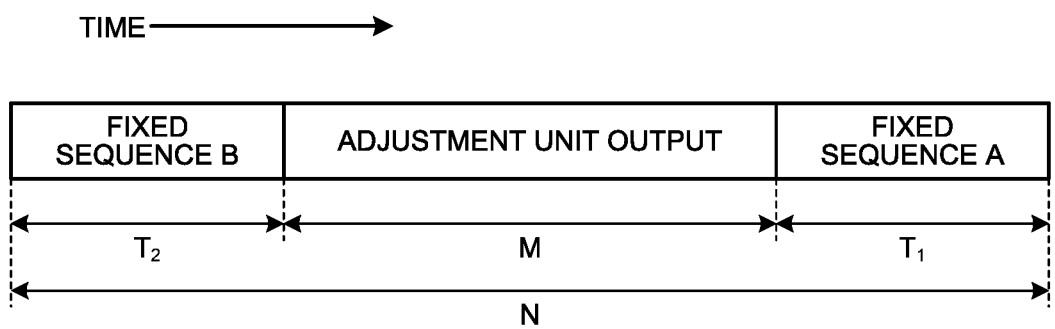
FIG. 3 is a diagram illustrating a configuration of a block X output by a multiplexing unit according to the first embodiment.

The configuration of the block X output from the multiplexing unit 15 is as illustrated in FIG. 3. In FIG. 3, the fixed sequence A and the fixed sequence B are the two divisions of the fixed sequence generated by the multiplexing unit 15, and the adjustment unit output is the data sequence output from the adjustment unit 13. As illustrated in FIG. 3, the adjustment unit output is sandwiched between the two divisions, namely the fixed sequence A and the fixed sequence B.

The block X output from the multiplexing unit 15 is an input signal to the interpolation unit 16. The interpolation unit 16 performs interpolation processing on the block X, which is a time domain signal, to generate a transmission signal. In the interpolation processing, the interpolation unit 16 makes the length of the block X an integral multiple or fractional multiple of the input length. That is, the interpolation unit 16 sets the length of the output signal, which is a transmission signal, to N1=N×F. Here, F is an integer or a fraction of one or more, e.g. 3/2, 4/3, etc. Note that N1 is an integer that satisfies N1≥N.

The block output from the interpolation unit 16 is the block Y, and the number of samples of the block Y is N1. The interpolation unit 16 applies the process of causing returning cyclicity in the phase of each signal in the block Y. For example, interpolation processing is performed using the signal interpolation formula or the like described in the literature "B. Porat, 'A Course in Digital Signal Processing', John Wiley and Sons Inc., 1997" (hereinafter referred to as the Porat literature), whereby returning cyclicity occurs in the phase of each signal in the block Y. Returning cyclicity specifically means that, assuming that the signal of the block Y is $y_0, y_1, \ldots, y_{N1-1}$, there is continuity between the phases of $y_{N1-1}$ and $y_0$, that is, the phase of $y_{N1-1}$ is continuous with the phase of $y_0$. That is, inserting fixed sequences at the both ends of blocks as in the present embodiment causes the phase of $y_{N1-1}$ at the tail of the first block to become continuous with the phase of $y_0$ at the head of the second block adjacent to the first block on the time axis, whereby phase continuity is established between the two blocks. Interpolation processing is also generally referred to as oversampling processing. Therefore, the block Y is an N1-sample signal obtained by inserting interpolation samples between the N samples of the block X.

Note that the transmitter 10 according to the present embodiment performs, on each block, the above-mentioned processes in the conversion unit 12 to the interpolation unit 16. That is, the same fixed sequence is inserted in the same place of each block. For example, suppose the sequence output by the adjustment unit 13 in the process for the K-th block is $s_{k, 0}, s_{k, 1}, \ldots, s_{k, M-1}$. In this case, the block X output by the multiplexing unit 15 is represented by Formula (3). In Formula (3), m is a block number. The range of block numbers is generally determined by the frame length or burst length. One frame includes one or more block signals, and one burst includes one or more frames.

[Formula 3]

$$p_0, p_1, \ldots, p_{\frac{T}{2}-1}, s_{m,0}, s_{m,1}, \ldots, s_{m,M-1}, p_{\frac{T}{2}}, p_{\frac{T}{2}+1}, \ldots, p_{T-1} \quad (3)$$

The block Y output from the interpolation unit 16 is an input signal to the transmission unit 17. The transmission unit 17 performs digital-to-analog conversion processing, frequency conversion processing, and the like on the input block Y, and transmits the block Y to the terminal 2. Note that the transmission unit 17 does not have to perform the process of adding a cyclic prefix (CP) required by conventional OFDM transmitters. The reason why the process of adding a CP is not necessary is that the fixed sequences are correspondingly inserted at the head and tail of the OFDM signal of each block in the multiplexing unit 15. That is, in two consecutive blocks, the fixed sequence placed at the tail of the preceding block and the fixed sequence placed at the head of the following block look like an inserted CP.

Figure 4:
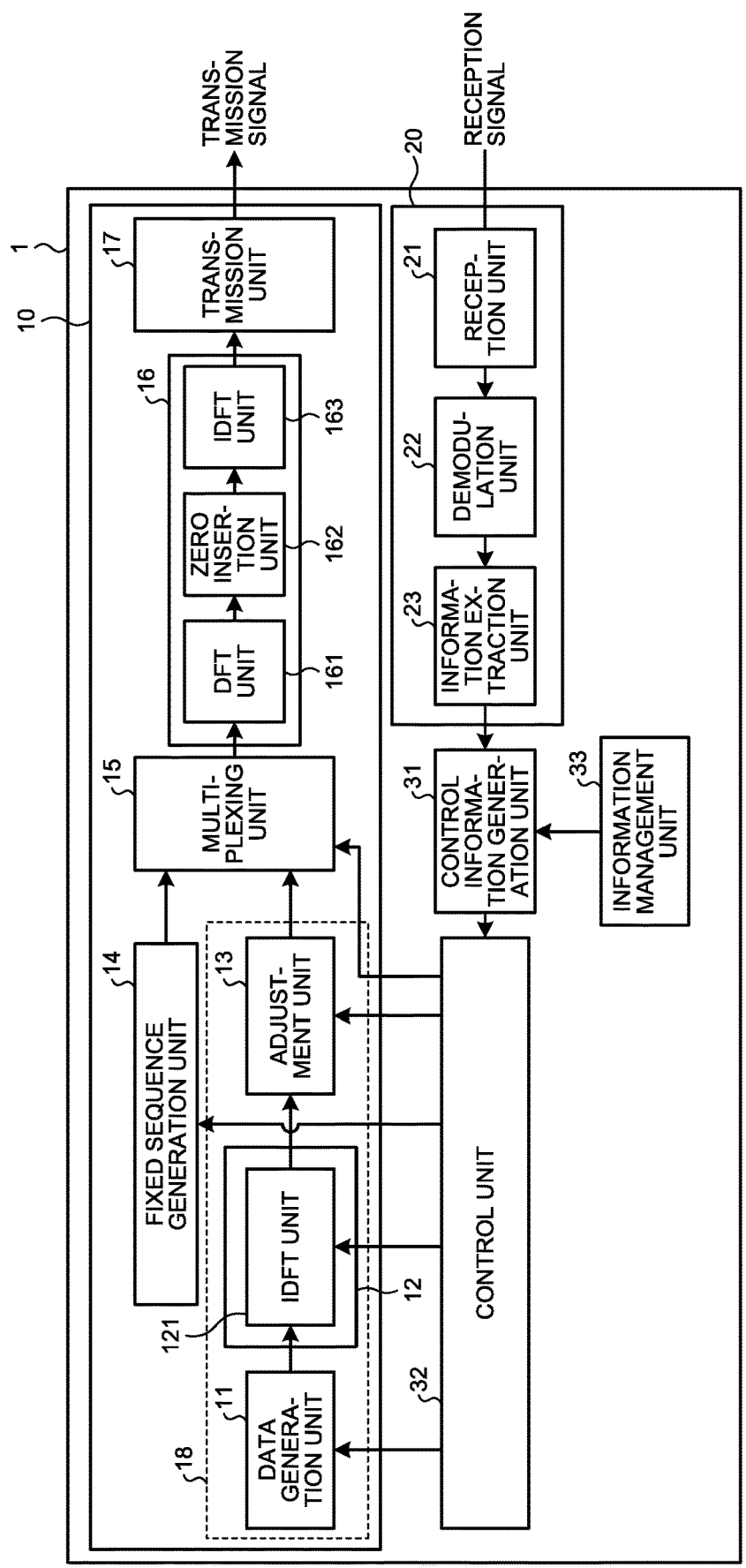
FIG. 4 is a diagram illustrating an exemplary configuration of a conversion unit and an interpolation unit according to the first embodiment.

Here, a specific example of the conversion unit 12 and the interpolation unit 16 will be described. FIG. 4 is a diagram illustrating an exemplary configuration of the conversion unit 12 and the interpolation unit 16 according to the first embodiment. FIG. 4 also depicts other components constituting the base station 1.

As illustrated in FIG. 4, the conversion unit 12 includes an inverse discrete Fourier transform (IDFT) unit 121. The IDFT unit 121 performs N-point IDFT processing on the input signal to convert it into a time domain signal. The output of the IDFT unit 121 is N points. The interpolation unit 16 includes a discrete Fourier transform (DFT) unit 161, a zero insertion unit 162, and an IDFT unit 163. The DFT unit 161 is a frequency domain conversion unit that performs N-point DFT processing on the input signal to convert it into a frequency domain signal. The output of the DFT unit 161 is N points. The zero insertion unit 162 inserts zeros into the input signal. Zero insertion processing in the frequency domain is equivalent to interpolation processing in the time domain. There is no restriction on where zeros are inserted. The zero insertion unit 162 inserts zeros into the input signal, for example, using the method described in the Porat literature. The zero insertion unit 162 inserts K-N zeros. That is, the zero insertion unit 162 inserts zeros into the N-point input signal to generate a K-point signal, and outputs this signal. The IDFT unit 163 is a time domain conversion unit that performs K-point IDFT processing on the input signal to convert it into a time domain signal. As described in the Porat literature above, DFT processing, zero insertion processing, and IDFT processing for adjusting the signal points cause the phenomenon of continuity between the phases of $y_0$ and $y_{N1-1}$, i.e. the head and tail signals in the block Y output from the interpolation unit 16. That is, returning cyclicity occurs in the phase of each signal in the block Y.

Returning to FIG. 2, the reception unit 21 receives an uplink signal transmitted from the terminal 2 and executes frequency conversion processing, analog-to-digital conversion processing, and the like on the received uplink signal. An output signal from the reception unit 21 is an input signal to the demodulation unit 22. The demodulation unit 22 demodulates the input signal from the reception unit 21. In a case where the terminal 2 has encoded the transmission sequence, the demodulation unit 22 performs decoding processing on the demodulated signal to restore the information transmitted from the terminal 2. The information restored by the demodulation unit 22 is an input signal to the information extraction unit 23. From the input information, the information extraction unit 23 extracts the information required by the control information generation unit 31 in the subsequent stage. Specifically, the information extraction unit 23 extracts transmission path information from the information restored by the demodulation unit 22, and outputs the transmission path information to the control information generation unit 31. The transmission path information is information indicating the state of the transmission path between the base station 1 and the terminal 2, that is, the state of the downlink transmission path. The transmission path information includes, but is not limited to, information indicating the state of the transmission path by a complex number, the ratio of reception signal power to noise power, the number of paths in the multipath transmission path, and the like. The transmission path information extracted by the information extraction unit 23 is an input signal to the control information generation unit 31. The control information generation unit 31 determines the parameters of the transmission signal based on the state of the transmission path indicated by the input transmission path information. The parameters of the transmission signal as used herein include the length of the fixed sequence to be generated by the fixed sequence generation unit 14, the length of the two divisions of the fixed sequence to be generated by the multiplexing unit 15, and the like. The control information generation unit 31 generates control information indicating the determined parameters and outputs the control information to the control unit 32. Note that instead of the control information generation unit 31, the control unit 32 may determine the parameters of the transmission signal. In this case, the control information generation unit 31 outputs the transmission path information to the control unit 32. The control information generation unit 31 may generate control signals for the conversion unit 12, the adjustment unit 13, the fixed sequence generation unit 14, and the multiplexing unit 15, and the generated control signals may be transmitted from the control information generation unit 31 to the respective units.

If the fixed sequence length and the fixed sequence value are constant for a certain section, the fixed sequence may be read from a storage unit such as a memory. In this case, the fixed sequence generation unit 14 illustrated in FIG. 2 serves as a storage unit, and the control unit 32 transmits a control signal that instructs the storage unit to output the fixed sequence.

In the present embodiment, the fixed sequences are placed at the both ends of the block, namely one of the fixed sequences is placed at the head and the other one of the fixed sequences is placed at the tail of the block. If necessary, the fixed sequences are placed at the head and tail, and another fixed sequence may be further placed at a predetermined position other than the head and tail. In this case, the control unit 32 designates a position other than the head and tail and notifies the multiplexing unit 15 of the designated position. The multiplexing unit 15 places the fixed sequence generated by the fixed sequence generation unit 14 at the designated position. A position other than the head and tail corresponds to, for example, the middle of the N symbols input to the multiplexing unit 15. For example, suppose M in Formula (2) above is an even number. In this case, the multiplexing unit 15 places $q_0, q_1, \ldots, q_{T'-1}$ in $s_0, s_1, \ldots, s_{M-1}$ such that $q_0, q_1, \ldots, q_{T'-1}$ are centered at the position of $s_{M/2-1}$. Here, $q_i$ is a sequence different from $p_i$ and is output from the fixed sequence generation unit 14. T' is the length of the fixed sequence $q_i$, which is determined by the control unit 32. The reason why $q_i$ is placed at a position other than the both ends of the block is that when a fixed sequence for phase noise correction and Doppler shift correction is placed in the middle of the block, not at the both ends of the block, the terminal 2 can perform frequency correction such as phase noise correction and Doppler shift correction using the fixed sequence. Note that fixed symbols for a location other than the both ends do not need to be inserted into all blocks. In such a case, the control unit 32 only needs to inform the data generation unit 11 and the fixed sequence generation unit 14 of a block number in which $q_i$ is placed, that is, the block number m in Formula (3). In a case where $q_i$ is placed, the symbol length of the output signal from the adjustment unit 13 is N-T-T'. The data generation unit 11 may output symbols with a length of N, and the adjustment unit 13 may replace a total of T+T' symbols with zeros, where T is the sum of the symbols at the both ends and T' is the symbols centered at the position designated by the control unit 32. Alternatively, the data generation unit 11 may output symbols with a length of N-T', and the adjustment unit 13 may replace a total of T symbols at the both ends with zeros.

The control information generation unit 31 can receive a signal from the information management unit 33. The information management unit 33 manages the control information received from the higher layer. The higher layer as used herein may be, but is not limited to, a higher-level device that manages the base station 1 including the transmitter 10 or another base station. The control information received from the higher layer includes, for example, the number of samples N of the OFDM block and the length T of the fixed sequence to be generated by the fixed sequence generation unit 14. In this case, these pieces of information, i.e. the number of samples N and the length T, are determined in the higher layer. The higher layer may also determine the length by which the adjustment unit 13 shortens the input signal, that is, the number of samples of the adjusted signal or the number of samples to be reduced in adjustment processing, and information on the determined length may be input from the higher layer to the information management unit 33. Information on the fixed sequence value and the position where the fixed sequence is placed may be input from the higher layer to the information management unit 33, and the information management unit 33 may output the information to the control information generation unit 31. Control information including instructions to always use fixed values of parameters and a fixed position, or control information including instructions to use fixed values of parameters and a fixed position for a plurality of designated blocks and block sections, may be input from the higher layer to the information management unit 33. The higher layer generates control information based on the congestion state of the network and the like. For example, when the network is congested, it is difficult to transmit a large volume of data. Therefore, the higher layer can generate control information including instructions to configure a transmission frame with a shortened block length.

Based on the control information input from the control information generation unit 31, the control unit 32 generates control signals for the data generation unit 11, the conversion unit 12, the adjustment unit 13, the fixed sequence generation unit 14, and the multiplexing unit 15. As described above, the control unit 32 notifies the fixed sequence generation unit 14 of the length T of the fixed sequence to be generated, notifies the adjustment unit 13 of the length of the data sequence to be output, and notifies the multiplexing unit 15 of the lengths $T_1$ and $T_2$ of the two divisions of the fixed sequence. Note that the control unit 32 also notifies the adjustment unit 13 of the length of the signal to be deleted and the deletion method. A specific example of the deletion method is deletion with a digital filter. The control unit 32 may also notify the adjustment unit 13 of whether to adjust the length of the input signal. The length of the data sequence to be output from the adjustment unit 13, that is, the number of points to be deleted from the input signal by the adjustment unit 13, may be variable.

The control unit 32 notifies the data generation unit 11 of the modulation level of data symbols to be generated and the number of data symbols to be generated. The control unit 32 notifies the conversion unit 12 how to convert the input data symbols.

In order for the terminal 2 to receive a signal transmitted by the base station 1 and restore the original data, the terminal 2 needs to know the contents of the transmission processing performed by the base station 1. The contents of the transmission processing performed by the base station 1 are parameterized and transmitted from the base station 1 to the terminal 2 as control information. The terminal 2 performs reception processing using the parameters received from the base station 1 as control information. The base station 1 transmits control information to the terminal 2 according to, for example, the Radio Resource Control (RRC) protocol defined in the 3GPP LTE standards. The control information may include parameters specifying the data length, the type of fixed sequence, and the like. The base station 1 adds parameters that do not generally change over a long period of time to control information that is transmitted in the higher layer, so that these are transmitted to the terminal 2. The base station 1 adds adaptively changing parameters to control information that is periodically transmitted, so that these are transmitted to the terminal 2. For example, because the PDCCH defined in the 3GPP LTE standards can be used for periodic transmission of control information to the terminal, the base station 1 transmits the control information using the PDCCH.

Figure 5:
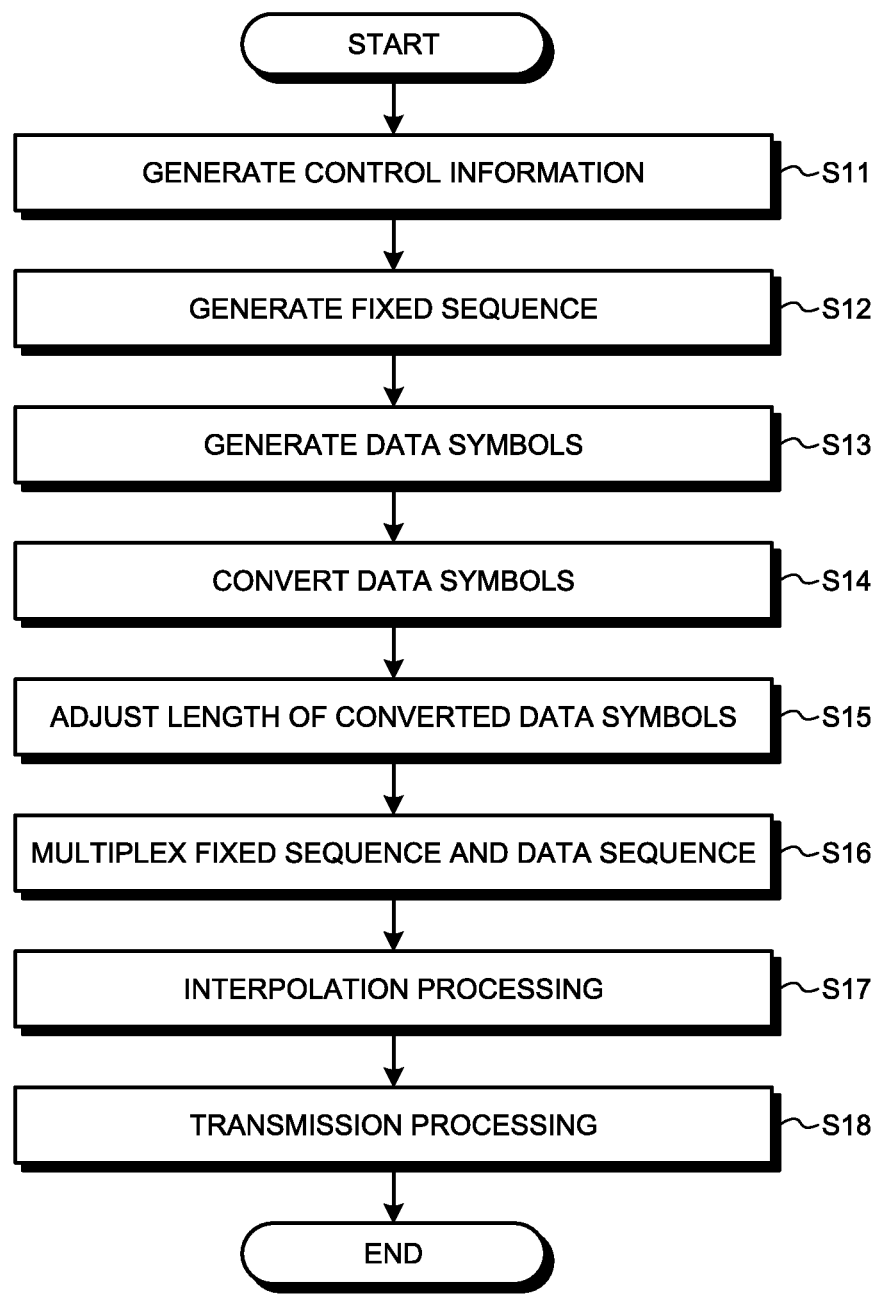
FIG. 5 is a flowchart illustrating an operation example in which the base station according to the first embodiment transmits a downlink signal.

Next, the operation in which the base station 1 transmits a downlink signal will be described with reference to FIG. 5. FIG. 5 is a flowchart illustrating an operation example in which the base station 1 transmits a downlink signal.

The base station 1 first generates control information that is transmitted to the terminal 2 (step S11). The control information that is transmitted to the terminal 2 is, for example, parameters necessary for the terminal 2 to demodulate a data signal. These parameters indicate the modulation scheme applied to the data signal, the encoding scheme, the length of the fixed sequence included in one block, the type of fixed sequence, and the like. The control information is generated by the control unit 32. In this case, the control information is input from the control unit 32 to the data generation unit 11 and is transmitted as data symbols. The control information generation unit 31 may generate control information that is transmitted to the terminal 2. In this case, the control information generation unit 31 may output the generated control information to the control unit 32 and transmit the generated control information to the terminal 2 via the data generation unit 11, or may transmit the generated control information to the terminal 2 via the multiplexing unit 15. In order to transmit the control information via the multiplexing unit 15, the control information generation unit 31 generates data symbols including the control information and outputs the data symbols to the multiplexing unit 15.

Next, the base station 1 generates a fixed sequence (step S12), and further generates data symbols (step S13). As described above, the fixed sequence generation unit 14 generates a fixed sequence, and the data generation unit 11 generates data symbols. The order of executing steps S12 and S13 may be reversed. Alternatively, these two steps may be executed in parallel. The data generation unit 11 generates data symbols, the number of which is designated by the control unit 32. The fixed sequence generation unit 14 generates fixed symbols, the number of which is designated by the control unit 32.

Next, the base station 1 converts the data symbols generated in step S13 into a time domain signal to generate a time domain data signal (step S14). Step S14 is performed by the conversion unit 12.

Next, the base station 1 adjusts the length of the data signal which is the data symbols converted into a time domain signal (step S15). Step S15 is performed by the adjustment unit 13. The adjustment unit 13 adjusts the length of the input data signal to the length designated by the control unit 32 and outputs the adjusted signal.

Next, the base station 1 multiplexes the fixed sequence generated in step S12 and the data sequence which is the data signal subjected to the length adjustment in step S15 (step S16). Step S16 is performed by the multiplexing unit 15. The multiplexing unit 15 divides the fixed sequence into two divisions having the length designated by the control unit 32, places each of the two divisions at the head and tail of the block, correspondingly, and places the data sequence between the two divisions to generate the block X.

Next, the base station 1 performs interpolation processing on the block X generated by multiplexing the fixed sequence and the data sequence (step S17). Step S17 is performed by the interpolation unit 16. The interpolation unit 16 converts the block X into a frequency domain signal, inserts zeros, and converts the frequency domain signal into a time domain signal again to generate a signal with a predetermined length.

Next, the base station 1 transmits the signal generated in step S17 to the terminal 2 (step S18). Step S18 is performed by the transmission unit 17.

As described above, the transmitter 10 constituting the base station 1 according to the present embodiment places the two fixed sequences which are obtained by dividing the fixed sequence so that one of the two fixed sequences is placed at the head and the other one of the two fixed sequences is placed at the tail of the block, and places the data symbol in the middle of the block, namely between the two fixed sequences, to generate a block signal. In addition, the transmitter 10 inserts zeros into the block signal in the frequency domain and performs interpolation processing to generate a transmission signal. Consequently, two consecutive block signals have continuous phases, so that the out-of-band power of the transmission signal can be suppressed. Because the fixed sequence is placed at the head and tail of the block signal, there is no need to add a CP, so that the transmission efficiency can be improved. In the case of a nonzero fixed sequence, that is, a fixed sequence other than a zero sequence, the reception side can estimate the transmission path using the fixed sequence, and there is no need to transmit a reference signal to the block. Therefore, the transmission efficiency can be further improved.

Next, the hardware configuration of the base station 1 according to the first embodiment will be described. Each component of the base station 1 is implemented by a processing circuit. The processing circuit may be a circuit in which a processor executes software or a dedicated circuit. In addition, some components may be implemented by a circuit in which a processor executes software, and the other components may be implemented by a dedicated circuit.

Figure 6:
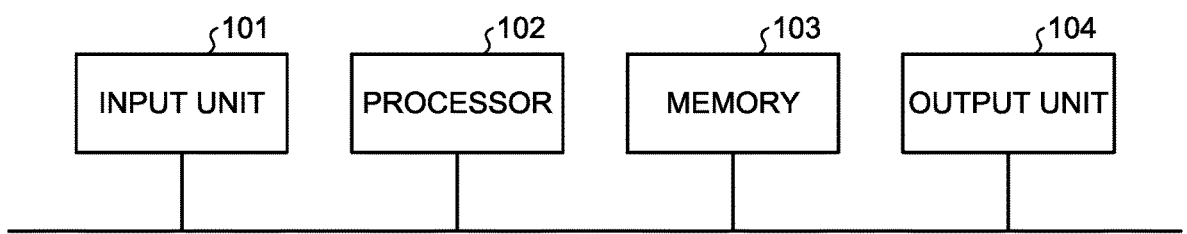
FIG. 6 is a diagram illustrating an example of a control circuit for implementing the base station according to the first embodiment.

In a case where the processing circuit is implemented by software, the processing circuit is, for example, the control circuit illustrated in FIG. 6. FIG. 6 is a diagram illustrating an example of a control circuit for implementing the base station 1. The control circuit includes an input unit 101, a processor 102, a memory 103, and an output unit 104. The input unit 101 is a circuit that receives data from the outside. The output unit 104 is a circuit that transmits data to the outside.

The processor 102 is a CPU (also referred to as a central processing unit, a central processing device, a processing device, a computation device, a microprocessor, a microcomputer, a processor, or a digital signal processor (DSP)). Examples of the memory 103 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read only memory (EEPROM), and the like. In a case where the processing circuit for implementing the components of the base station 1 is the control circuit illustrated in FIG. 6, the processor 102 reads and executes the program corresponding to each component of the base station 1 stored in the memory 103, whereby each component is implemented. The memory 103 is also used as a temporary memory for each process performed by the processor 102.

Figure 7:
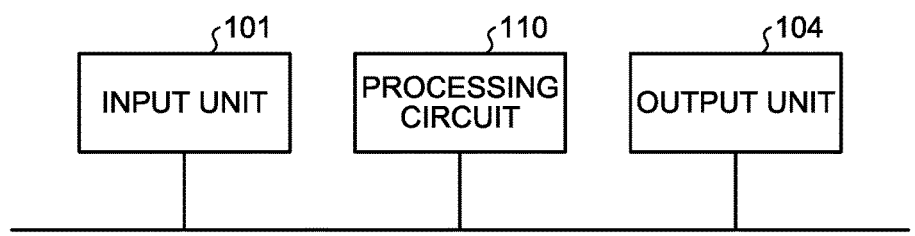
FIG. 7 is a diagram illustrating an example of dedicated hardware for implementing the base station according to the first embodiment.

In a case where some components of the base station 1 are implemented by dedicated hardware, these are implemented by the circuit illustrated in FIG. 7. FIG. 7 is a diagram illustrating an example of dedicated hardware for implementing the base station 1. The dedicated circuit illustrated in FIG. 7 includes the input unit 101, a processing circuit 110, and the output unit 104. The input unit 101 and the output unit 104 are the same as the input unit 101 and the output unit 104 illustrated in FIG. 6. The processing circuit 110 is a single circuit, a composite circuit, a programmed processor, a parallel programmed processor, an application specific integrated circuit (ASIC), a field programmable gate array (FPGA), or a combination thereof.

Second Embodiment

Next, a transmitter according to a second embodiment will be described. The transmitter according to the present embodiment constitutes the base station 1 of the communication system illustrated in FIG. 1 in the same manner as the transmitter 10 described in the first embodiment. In the following description, the base station according to the second embodiment is referred to as the base station 1a in order to distinguish it from the base station 1 described in the first embodiment. Hereinafter, differences from the first embodiment will be described.

Figure 8:
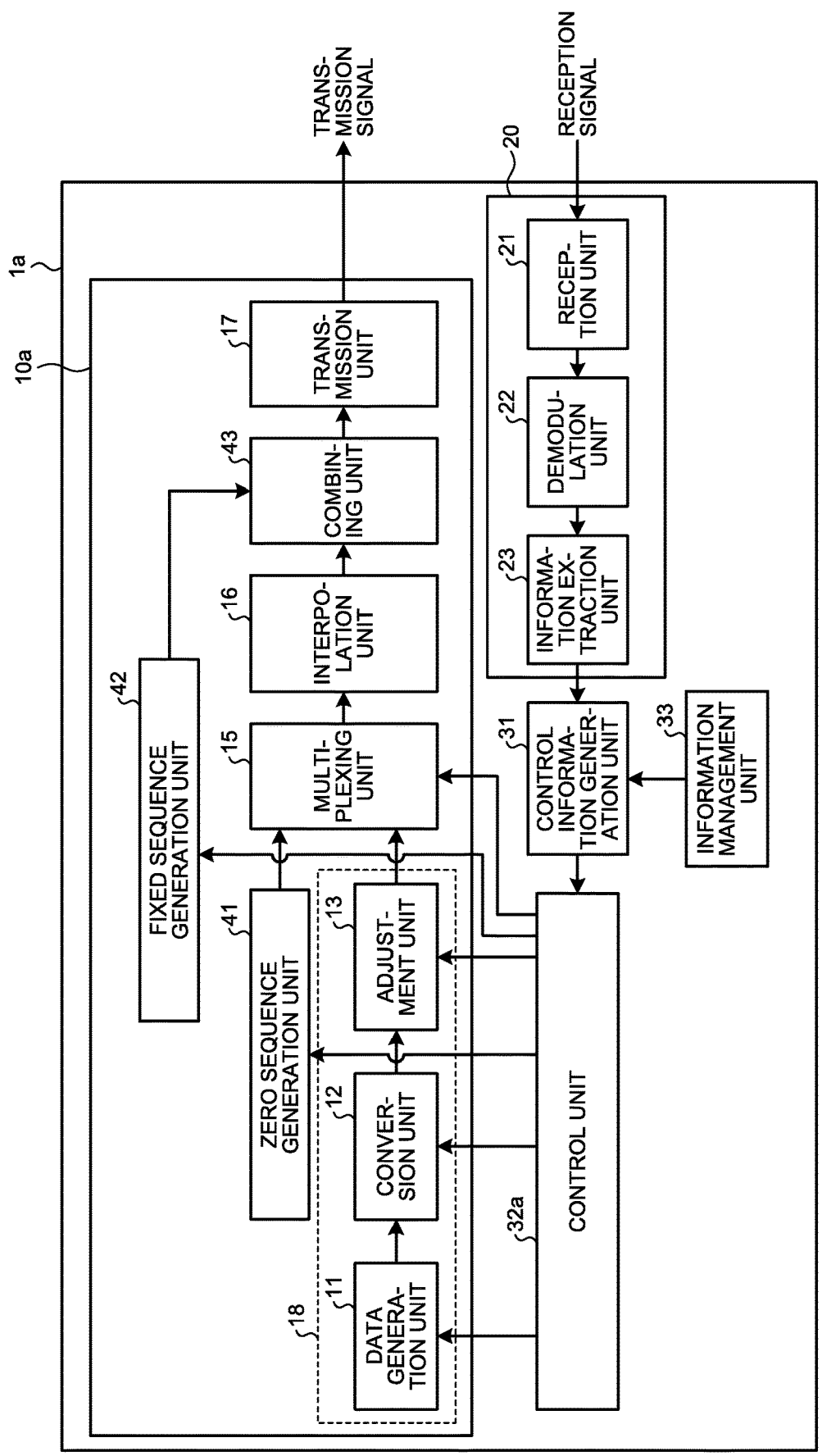
FIG. 8 is a diagram illustrating an exemplary configuration of a base station according to a second embodiment.

FIG. 8 is a diagram illustrating an exemplary configuration of the base station 1a according to the second embodiment. The base station 1a is obtained by replacing the transmitter 10 and the control unit 32 of the base station 1 according to the first embodiment with a transmitter 10a and a control unit 32a. The transmitter 10a includes the data generation unit 11, the conversion unit 12, the adjustment unit 13, the multiplexing unit 15, the interpolation unit 16, the transmission unit 17, a zero sequence generation unit 41, a fixed sequence generation unit 42, and a combining unit 43. The data generation unit 11, the conversion unit 12, the adjustment unit 13, the multiplexing unit 15, the interpolation unit 16, and the transmission unit 17 of the transmitter 10a execute the same processes as the corresponding components of the transmitter 10 according to the first embodiment. Therefore, descriptions of these components are omitted.

The zero sequence generation unit 41 generates zero symbols, the number of which is designated by the control unit 32*a*, and outputs the zero symbols to the multiplexing unit 15 as a zero sequence. Note that the multiplexing unit 15 divides the zero sequence input from the zero sequence generation unit 41 into two divisions and places each of the two divisions at the head and tail of the block, correspondingly. The zero sequence generation unit 41 is a first fixed sequence generation unit in the transmitter 10*a*.

Figure 9:
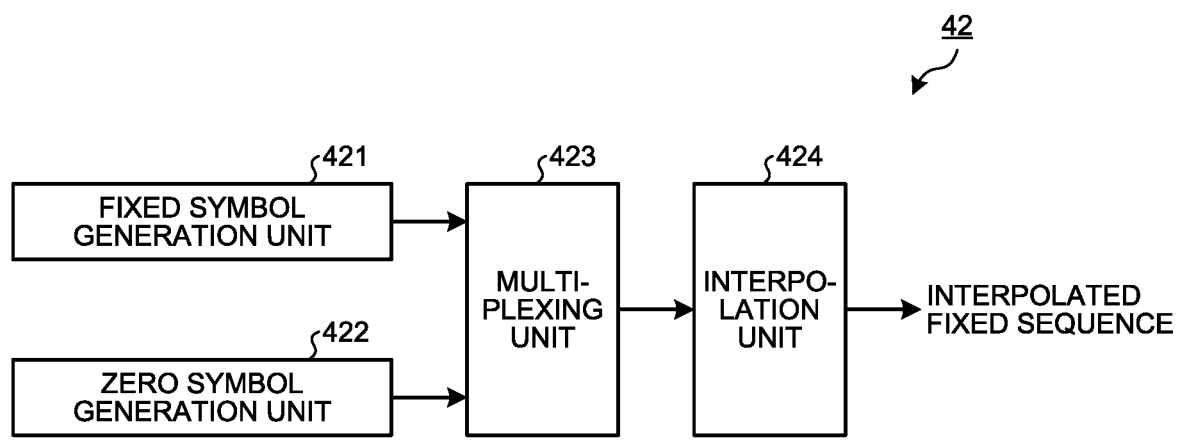
FIG. 9 is a diagram illustrating an exemplary configuration of a fixed sequence generation unit according to the second embodiment.

The fixed sequence generation unit 42, which is a second fixed sequence generation unit in the transmitter 10*a*, generates a fixed sequence including a plurality of fixed symbols. Here, the fixed sequence generation unit 42 generates a fixed sequence by performing processing similar to the interpolation processing that the interpolation unit 16 performs on the block X input from the multiplexing unit 15. The fixed sequence generation unit 42 generates a nonzero fixed sequence, performs the interpolation processing described in the above-mentioned D. C. Chu literature, for example, on the generated fixed sequence, and outputs the interpolated fixed sequence. FIG. 9 is a diagram illustrating an exemplary configuration of the fixed sequence generation unit 42. The fixed sequence generation unit 42 includes a fixed symbol generation unit 421, a zero symbol generation unit 422, a multiplexing unit 423, and an interpolation unit 424. The fixed symbol generation unit 421 generates a plurality of fixed symbols and outputs the plurality of fixed symbols to the multiplexing unit 423. The zero symbol generation unit 422 generates a plurality of zero symbols and outputs the plurality of zero symbols to the multiplexing unit 423. Note that the number of fixed symbols generated by the fixed symbol generation unit 421 is the same as the number of zero symbols generated by the zero sequence generation unit 41. The number of zero symbols generated by the zero symbol generation unit 422 is the same as the number of data symbols output from the adjustment unit 13 to the multiplexing unit 15. The multiplexing unit 423 performs the same processing as the multiplexing unit 15. Specifically, the multiplexing unit 423 divides the plurality of fixed symbols into two divisions, places each of the two divisions at the head and tail of the block, correspondingly, and places the plurality of zero symbols in the middle of the block. Note that the ratio in which the multiplexing unit 423 divides the plurality of fixed symbols into two divisions is the same as the ratio in which the multiplexing unit 15 divides the zero sequence into two divisions. In the same manner as the interpolation unit 16, the interpolation unit 424 executes interpolation processing on the input signal from the multiplexing unit 423, that is, the signal including the plurality of fixed symbols at the head and tail of the block and the plurality of zero symbols in the middle of the block. That is, the number of symbols output from the interpolation unit 424 and the number of symbols output from the interpolation unit 16 are equal.

Note that the fixed sequence generation unit 42 may be configured to hold the interpolated fixed sequence in a memory to read and output the fixed sequence. In this case, the fixed sequence generation unit 42 may hold multiple types of fixed sequences in a memory and output one of the fixed sequences according to an instruction from the control unit 32*a*.

The combining unit 43 combines the input signal from the interpolation unit 16 and the input signal from the fixed sequence generation unit 42. Specifically, the combining unit 43 replaces the interpolated zero sequence included in the input signal from the interpolation unit 16 with the interpolated fixed sequence included in the input signal from the fixed sequence generation unit 42. As a result, a signal similar to the signal output by the interpolation unit 16 of the transmitter 10 according to the first embodiment is generated. An output signal from the combining unit 43 is an input signal to the transmission unit 17.

The control unit 32*a* outputs control signals to the data generation unit 11, the conversion unit 12, the adjustment unit 13, the multiplexing unit 15, the zero sequence generation unit 41, and the fixed sequence generation unit 42 so that each unit operates as instructed.

Figure 10:
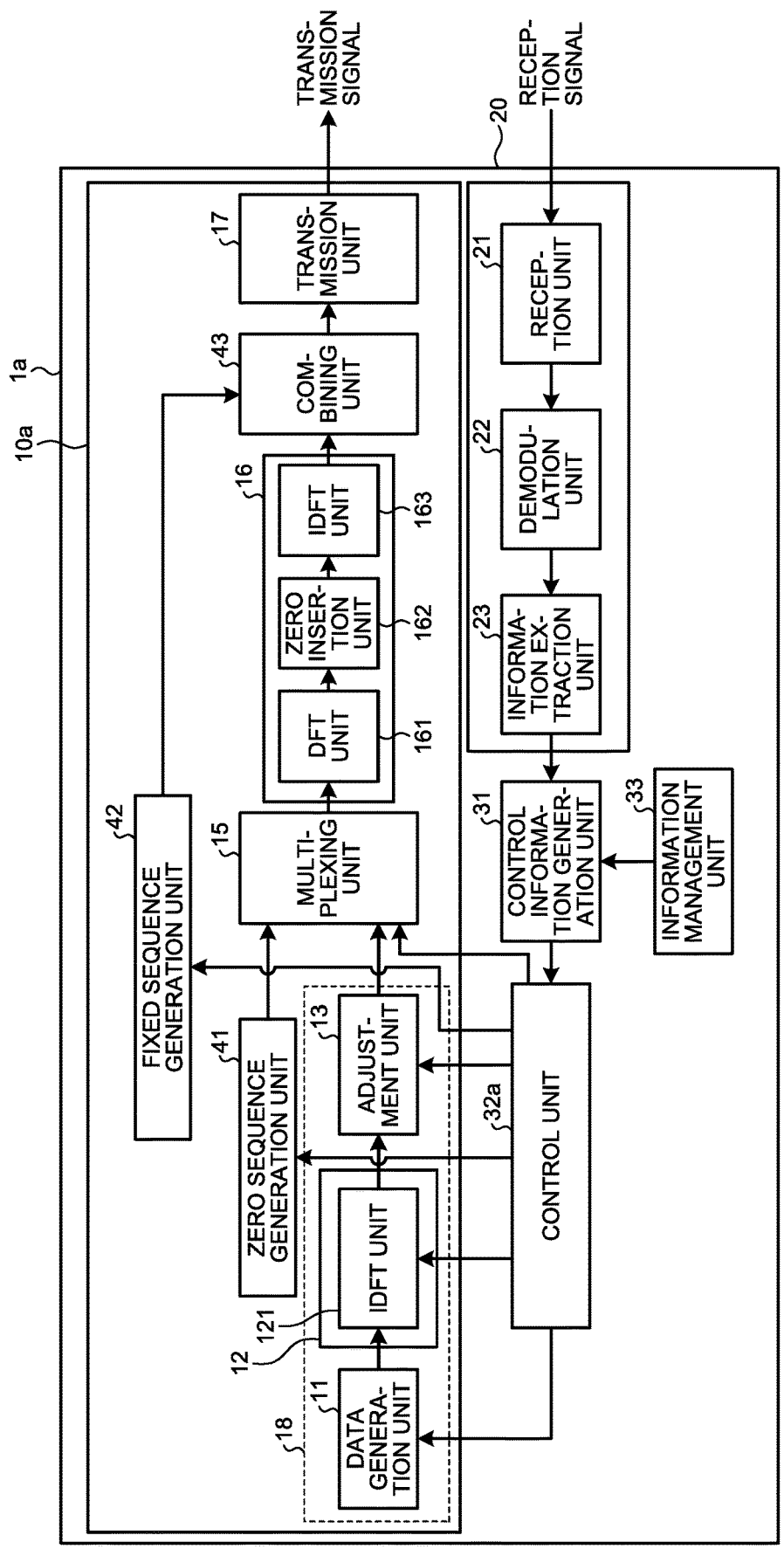
FIG. 10 is a diagram illustrating an exemplary configuration of a conversion unit and an interpolation unit according to the second embodiment.

As illustrated in FIG. 10, the configuration of the conversion unit 12 and the interpolation unit 16 of the transmitter 10*a* is the same as the configuration of the conversion unit 12 and the interpolation unit 16 of the transmitter 10.

Figure 11:
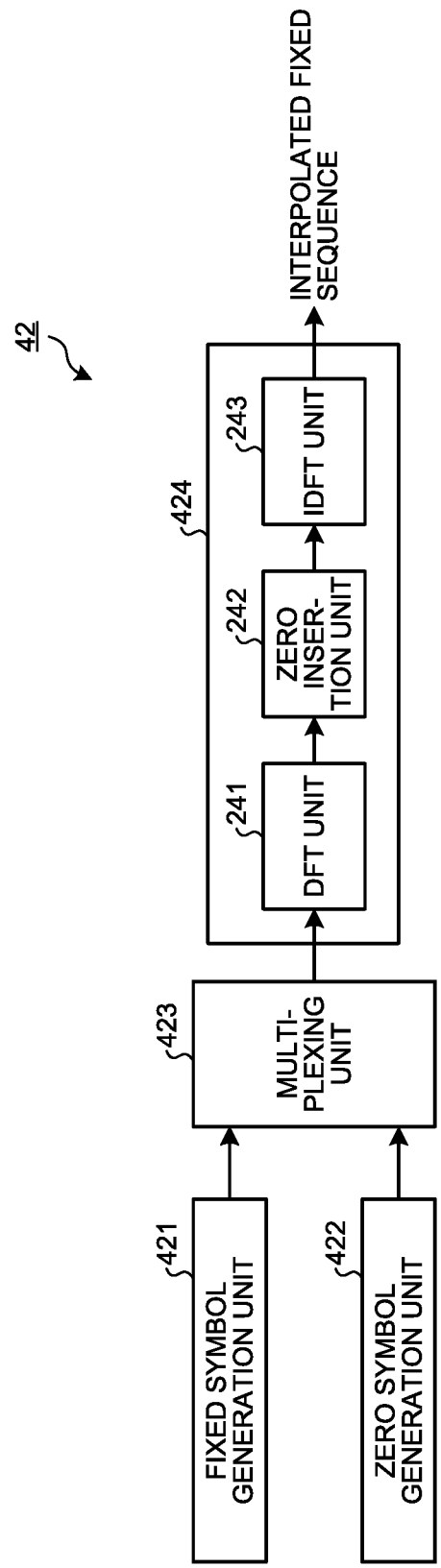
FIG. 11 is a diagram illustrating an exemplary configuration of the fixed sequence generation unit according to the second embodiment.

The interpolation unit 424 of the fixed sequence generation unit 42 illustrated in FIG. 9 includes a DFT unit 241, a zero insertion unit 242, and an IDFT unit 243 as illustrated in FIG. 11. In the same manner as the DFT unit 161 of the interpolation unit 16, the DFT unit 241 performs N-point DFT processing on the input signal. The zero insertion unit 242 inserts zeros into the input signal. The zero insertion unit 242 inserts zeros into the input signal in the same manner as the zero insertion unit 162 of the interpolation unit 16. In the same manner as the zero insertion unit 162 of the interpolation unit 16, the zero insertion unit 242 inserts K-N zeros. In the same manner as the IDFT unit 163 of the interpolation unit 16, the IDFT unit 243 executes K-point IDFT processing on the input signal.

As described above, in the transmitter 10*a* according to the present embodiment, the multiplexing unit 15 generates a block signal including zero sequences at the head and tail and a data sequence in the middle, and the interpolation unit 16 performs interpolation processing on the block signal. The fixed sequence generation unit 42 generates an interpolated fixed sequence, and the combining unit 43 combines the interpolated block signal and the interpolated fixed sequence to generate a transmission signal. The transmitter 10*a* according to the present embodiment can suppress the out-of-band power of the transmission signal and improve the transmission efficiency in the same manner as the transmitter 10 according to the first embodiment.

Note that the transmitter 10*a* according to the present embodiment can be implemented by the hardware configured as illustrated in FIG. 6 or 7 in the same manner as the transmitter 10 according to the first embodiment.

In the present embodiment, the fixed sequences are placed at the both ends of the block, namely the head and tail of the block. If necessary, the fixed sequences are placed at the head and tail, and another fixed sequence may be further placed at a predetermined position other than the both ends. In this case, the control unit 32*a* designates a position other than the both ends and notifies the fixed sequence generation unit 42 of the designated position. The fixed sequence generation unit 42 generates a signal in which fixed sequences are placed at the both ends of the block and the designated position, and performs interpolation processing to generate an interpolated fixed sequence. In the combining unit 43, the sequence generated by the fixed sequence generation unit 42 is combined with the signal output from the interpolation unit 16. A position other than the both ends corresponds to, for example, the middle of the N symbols input to the multiplexing unit 15. As described above, the data sequence generation unit 18 and the multiplexing unit 15 generate a block signal in which the samples at the head and tail of the block are replaced with zeros and the samples near the location designated by the control unit 32*a* are also replaced with zeros. Then, in the fixed sequence generation unit 42, the fixed symbol generation unit 421 generates $q_i$ and $p_i$, and the multiplexing unit 423 places $q_i$ and $p_i$ at the designated locations. Here, $q_i$ and $p_i$ are different sequences. T' is the length of the fixed sequence $q_i$, which is determined by the control unit 32a. For example, $p_i$ is divided and placed at the head and tail of the block by the multiplexing unit 423. Then, $q_i$ is placed at a location other than the both ends of the block by the multiplexing unit 423. The reason why $q_i$ is placed at a position other than the both ends of the block is that if a fixed sequence for phase noise correction and Doppler shift correction is placed in the middle of the block, not at the both ends of the block, the terminal 2 can perform frequency correction such as phase noise correction and Doppler shift correction using the fixed sequence. Note that fixed symbols for a location other than the both ends do not need to be inserted into all blocks. In such a case, the control unit 32a only needs to inform the data generation unit 11, the zero sequence generation unit 41, and the fixed sequence generation unit 42 of a block number in which $q_i$ is placed, that is, the block number m in Formula (3).

Third Embodiment

Next, a transmitter according to a third embodiment will be described. The transmitter according to the present embodiment constitutes the base station 1 of the communication system illustrated in FIG. 1 in the same manner as the transmitter 10 described in the first embodiment. The transmitter according to the present embodiment is a modification of the transmitter 10 described in the first embodiment. In the following description, the base station according to the third embodiment is referred to as the base station 1b in order to distinguish it from the base station 1 described in the first embodiment and the base station 1a described in the second embodiment. Hereinafter, differences from the first embodiment will be described.

Figure 12:
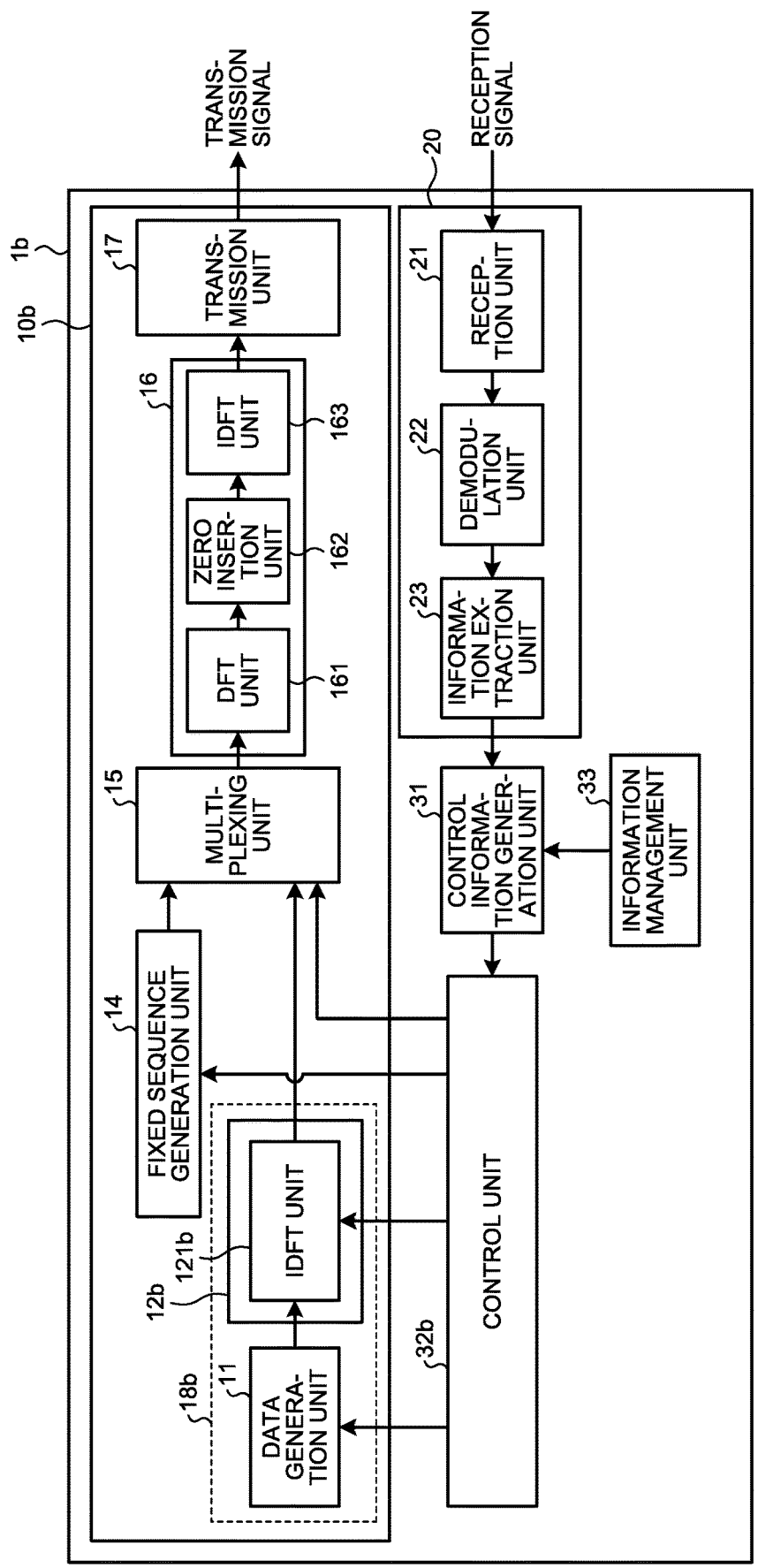
FIG. 12 is a diagram illustrating an exemplary configuration of a base station according to a third embodiment.

FIG. 12 is a diagram illustrating an exemplary configuration of the base station 1b according to the third embodiment. The base station 1b is obtained by replacing the transmitter 10 and the control unit 32 of the base station 1 according to the first embodiment with a transmitter 10b and a control unit 32b. The transmitter 10b is obtained by removing the adjustment unit 13 from the transmitter 10 and replacing the conversion unit 12 with a conversion unit 12b. Because the components of the transmitter 10b other than the conversion unit 12b are the same as the corresponding components of the transmitter 10, descriptions thereof are omitted. Note that the data generation unit 11 and the conversion unit 12b constitute a data sequence generation unit 18b.

The conversion unit 12b includes an IDFT unit 121b that performs M-point IDFT processing on the input signal. The output of the IDFT unit 121b is M points. Therefore, the conversion unit 12b generates and outputs a time domain signal having the same length as the signal output from the adjustment unit 13 of the transmitter 10 according to the first embodiment.

Specifically, in the transmitter 10b according to the present embodiment, the data generation unit 11 generates and outputs M-sample data symbols, and the conversion unit 12b performs M-point IDFT processing on the M-sample data symbols input from the data generation unit 11 to generate an M-sample time domain signal.

The control unit 32b generates control signals for the data generation unit 11, the conversion unit 12b, the fixed sequence generation unit 14, and the multiplexing unit 15. The control signals generated by the control unit 32b are similar to the control signals output by the control unit 32 of the first embodiment to the data generation unit 11, the conversion unit 12, the fixed sequence generation unit 14, and the multiplexing unit 15. To the data generation unit 11, however, the control unit 32b outputs a control signal that instructs the data generation unit 11 to generate a data sequence having M sequences.

The configuration of the transmitter 10b according to the present embodiment can also achieve the effect described in the first embodiment.

Note that the transmitter 10b according to the present embodiment can be implemented by the hardware configured as illustrated in FIG. 6 or 7 in the same manner as the transmitter 10 according to the first embodiment.

In the present embodiment, the fixed sequences are placed at the both ends of the block, namely the head and tail of the block. If necessary, the fixed sequences are placed at the head and tail, and another fixed sequence may be further placed at a predetermined position other than the head and tail. In this case, the control unit 32b designates a position other than the head and tail and notifies the multiplexing unit 15 of the designated position. The multiplexing unit 15 places the fixed sequence generated by the fixed sequence generation unit 14 at the designated position. A position other than the head and tail corresponds to, for example, the middle of the M symbols input to the multiplexing unit 15. For example, suppose M in Formula (2) above is an even number. In this case, the multiplexing unit 15 places $q_0$, $q_1, \ldots, q_{T'-1}$ in $s_0, s_1, \ldots, s_{M-1}$ such that $q_0, q_1, \ldots, q_{T'-1}$ are centered at the position of $s_{M/2-1}$. Here, $q_i$ is a sequence different from $p_i$ and is output from the fixed sequence generation unit 14. T' is the length of the fixed sequence $q_i$, which is determined by the control unit 32b. The reason why $q_i$ is placed at a position other than the both ends of the block is that if a fixed sequence for phase noise correction and Doppler shift correction is placed in the middle of the block, not at the both ends of the block, the terminal 2 can perform frequency correction such as phase noise correction and Doppler shift correction using the fixed sequence. Note that fixed symbols for a location other than the both ends of a block do not need to be inserted into all blocks. In such a case, the control unit 32b only needs to inform the data generation unit 11 and the fixed sequence generation unit 14 of a block number in which $q_i$ is placed, that is, the block number m in Formula (3). In a case where $q_i$ is placed, the symbol length of the output signal from the data sequence generation unit 18b is M-T-T'.

Fourth Embodiment

Next, a transmitter according to a fourth embodiment will be described. The transmitter according to the present embodiment constitutes the base station 1 of the communication system 3 illustrated in FIG. 1 in the same manner as the transmitter 10 described in the first embodiment. The transmitter according to the present embodiment is a modification of the transmitter 10a described in the second embodiment. In the following description, the base station according to the fourth embodiment is referred to as the base station 1c in order to distinguish it from the base stations described in the first to third embodiments. Hereinafter, differences from the second embodiment will be described.

Figure 13:
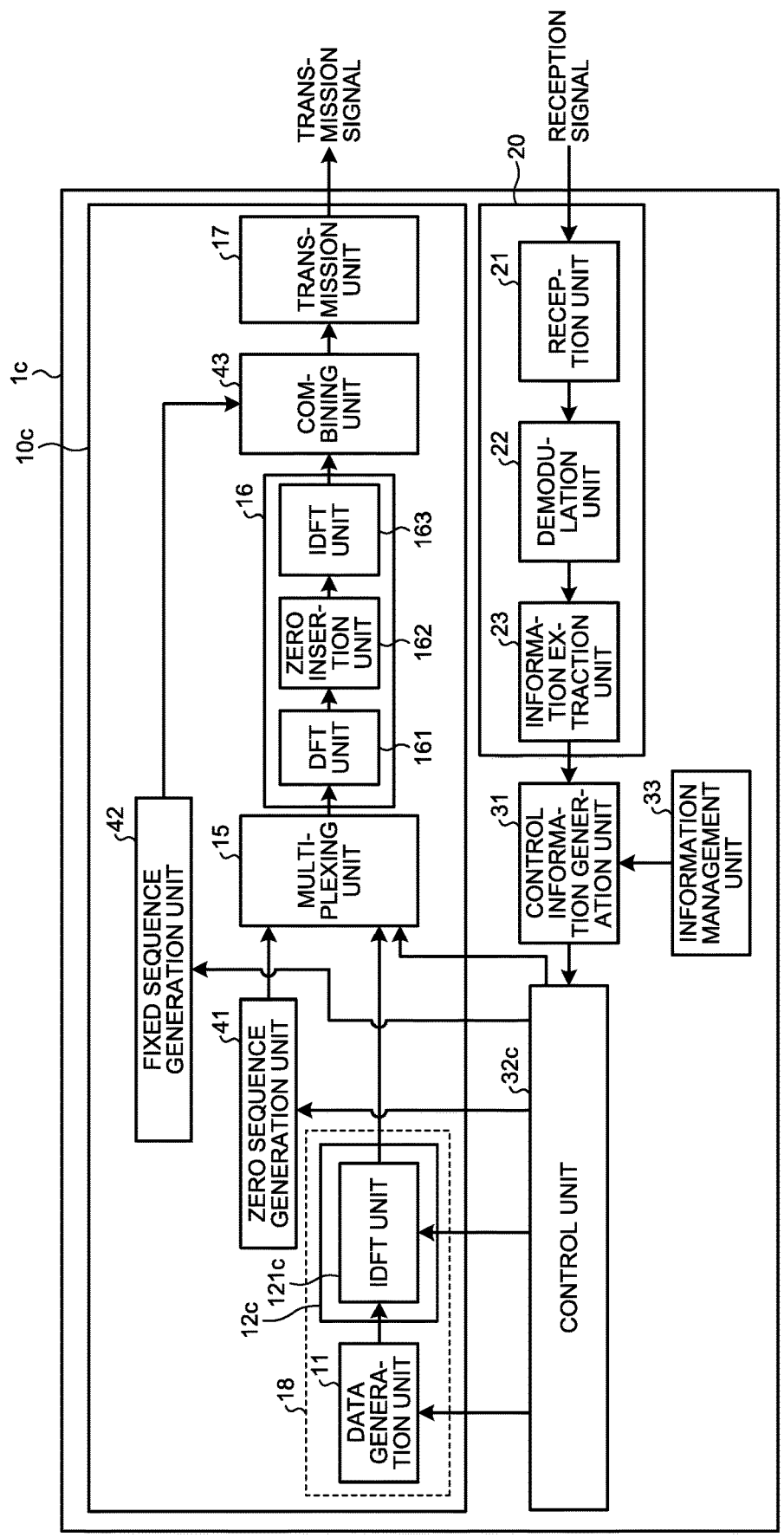
FIG. 13 is a diagram illustrating an exemplary configuration of a base station according to a fourth embodiment.

FIG. 13 is a diagram illustrating an exemplary configuration of the base station 1c according to the fourth embodiment. The base station 1c is obtained by replacing the transmitter 10a and the control unit 32a of the base station 1a according to the second embodiment with a transmitter 10c and a control unit 32c. The transmitter 10c is obtained by removing the adjustment unit 13 from the transmitter 10a and replacing the conversion unit 12 with a conversion unit 12c. Because the components of the transmitter 10c other than the conversion unit 12c are the same as the corresponding components of the transmitter 10a, descriptions thereof are omitted.

The conversion unit 12c includes an IDFT unit 121c that performs M-point IDFT processing on the input signal. The output of the IDFT unit 121c is M points. Therefore, the conversion unit 12c generates and outputs a time domain signal having the same length as the signal output from the adjustment unit 13 of the transmitter 10a according to the second embodiment.

Specifically, in the transmitter 10c according to the present embodiment, the data generation unit 11 generates and outputs a data sequence having M sequences, and the conversion unit 12c performs M-point IDFT processing on the data sequence input from the data generation unit 11 to generate an M-sample time domain signal.

The control unit 32c generates control signals for the data generation unit 11, the conversion unit 12c, the fixed sequence generation unit 42, and the multiplexing unit 15. The control signals generated by the control unit 32c are similar to the control signals output by the control unit 32a of the second embodiment to the data generation unit 11, the conversion unit 12a, the fixed sequence generation unit 42, and the multiplexing unit 15. To the data generation unit 11, however, the control unit 32c outputs a control signal that instructs the data generation unit 11 to generate a data sequence having M sequences.

The configuration of the transmitter 10c according to the present embodiment can also achieve the effect described in the second embodiment.

Note that the transmitter 10c according to the present embodiment can be implemented by the hardware configured as illustrated in FIG. 6 or 7 in the same manner as the transmitter 10 according to the first embodiment.

In the present embodiment, the fixed sequences are placed at the both ends of the block, namely the head and tail of the block. If necessary, the fixed sequences are placed at the head and tail, and another fixed sequence may be further placed at a predetermined position other than the both ends. In this case, the control unit 32c designates a position other than the both ends and notifies the fixed sequence generation unit 42 of the designated position. The fixed sequence generation unit 42 generates a signal in which fixed sequences are placed at the both ends of the block and the designated position, and performs interpolation processing to generate an interpolated fixed sequence. In the combining unit 43, the sequence generated by the fixed sequence generation unit 42 is combined with the signal output from the interpolation unit 16. A position other than the both ends corresponds to, for example, the middle of the N symbols input to the multiplexing unit 15. As described above, the data sequence generation unit 18b and the multiplexing unit 15 generate a block signal in which the samples at the head and tail of the block are replaced with zeros and the samples near the location designated by the control unit 32c are also replaced with zeros. Then, in the fixed sequence generation unit 42, the fixed symbol generation unit 421 generates $q_i$ and $p_i$, and the multiplexing unit 423 places $q_i$ and $p_i$ at the designated locations. Here, $q_i$ and $p_i$ are different sequences. T' is the length of the fixed sequence $q_i$ and is determined by the control unit 32c. For example, $p_i$ is divided and placed at the head and tail of the block by the multiplexing unit 423. Then, $q_i$ is placed at a location other than the both ends of the block by the multiplexing unit 423. The reason why $q_i$ is placed at a position other than the both ends of the block is that if a fixed sequence for phase noise correction and Doppler shift correction is placed in the middle of the block, not at the both ends of the block, the terminal 2 can perform frequency correction such as phase noise correction and Doppler shift correction using the fixed sequence. Note that fixed symbols for a location other than the both ends do not need to be inserted into all blocks. In such a case, the control unit 32c only needs to inform the data generation unit 11 and the fixed sequence generation unit 42 of a block number in which $q_i$ is placed, that is, the block number m in Formula (3).

Fifth Embodiment

In a fifth embodiment, the terminal 2 that receives signals transmitted by the base stations 1 and 1a described in the first and second embodiments will be described.

Figure 14:
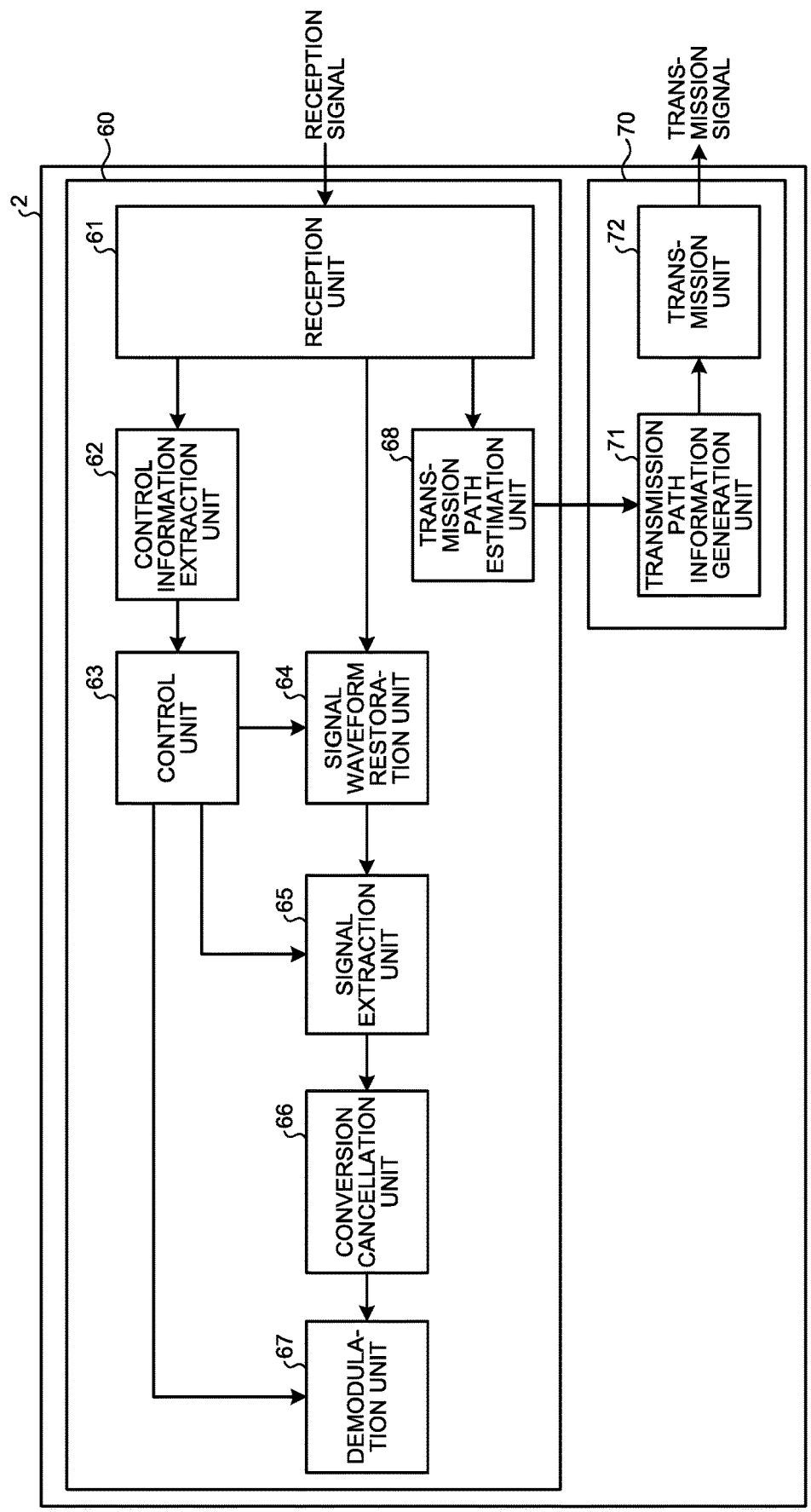
FIG. 14 is a diagram illustrating an exemplary configuration of a terminal according to a fifth embodiment.

FIG. 14 is a diagram illustrating an exemplary configuration of the terminal 2 according to the fifth embodiment. The terminal 2 includes a reception unit 61, a control information extraction unit 62, a control unit 63, a signal waveform restoration unit 64, a signal extraction unit 65, a conversion cancellation unit 66, a demodulation unit 67, a transmission path estimation unit 68, a transmission path information generation unit 71, and a transmission unit 72. The reception unit 61, the control information extraction unit 62, the control unit 63, the signal waveform restoration unit 64, the signal extraction unit 65, the conversion cancellation unit 66, the demodulation unit 67, and the transmission path estimation unit 68 constitute a receiver 60. The transmission path information generation unit 71 and the transmission unit 72 constitute a transmitter 70.

The reception unit 61 receives the downlink signal transmitted from the base station and executes frequency conversion processing, analog-to-digital conversion processing, and the like on the received downlink signal. An output signal from the reception unit 61 is an input signal to the control information extraction unit 62, the signal waveform restoration unit 64, and the transmission path estimation unit 68.

The control information extraction unit 62 extracts the control signal information included in the reception signal output from the reception unit 61 and outputs the control signal information to the control unit 63. For example, in the 3GPP LTE standards, the PDCCH corresponds to a signal including control information. In a case where the reception signal includes the PDCCH, the control information extraction unit 62 extracts the PDCCH and further extracts control information from the PDCCH to output the control information to the control unit 63. The control information output to the control unit 63 is parameters necessary for demodulating the data signal, and as described in the first embodiment, the control information indicates the modulation scheme, the encoding scheme, the length of the fixed sequence included in one block, the type of fixed sequence, and the like.

On the basis of the control information input from the control information extraction unit 62, the control unit 63 generates control signals for the signal waveform restoration unit 64, the signal extraction unit 65, and the demodulation unit 67. As a control signal for the signal waveform restoration unit 64, the control unit 63 generates a control signal that instructs the signal waveform restoration unit 64 to execute the reverse processing of the interpolation processing executed on the transmitter side, that is, the transmitter 10 or 10a. The control unit 63 generates, as a control signal for the signal waveform restoration unit 64, a control signal indicating the contents of the interpolation processing executed on the transmitter side. For example, the control unit 63 generates control information indicating the number of zeros inserted in the interpolation processing, the insertion position, and the like, and outputs the control information to the signal waveform restoration unit 64. The control unit 63 generates, as a control signal for the signal extraction unit 65, a control signal indicating the contents of the multiplex processing executed on the transmitter side. For example, the control unit 63 generates control information indicating the number of points of the data signal to be extracted, the position of the data signal, and the like, and outputs the control information to the signal extraction unit 65. The control unit 63 generates, as a control signal for the demodulation unit 67, a control signal indicating the modulation scheme applied to the data signal.

The signal waveform restoration unit 64 cancels the interpolation processing performed on the transmitter side. That is, the signal waveform restoration unit 64 removes the zeros inserted in the interpolation processing from the reception signal. Specifically, the signal waveform restoration unit 64 first converts the reception signal into a frequency domain signal, and removes zeros from the converted signal. The signal waveform restoration unit 64 also performs frequency domain equalization processing on the reception signal without zeros to remove the interference component added on the multipath transmission path from the reception signal. When the frequency domain equalization processing is completed, the signal waveform restoration unit 64 converts the equalized signal into a time domain signal and outputs the time domain signal. An output signal from the signal waveform restoration unit 64 is an input signal to the signal extraction unit 65.

The signal extraction unit 65 extracts a data signal, i.e. a signal to be demodulated, from the input signal and outputs the data signal to the conversion cancellation unit 66. As described in the first and second embodiments, the transmitters 10 and 10a multiplex the data sequence and the fixed sequence or the zero sequence to generate a signal to be subjected to interpolation processing, that is, a signal that has not undergone interpolation processing. Therefore, the signal extraction unit 65 extracts a data signal, namely a data sequence, from the input signal.

The conversion cancellation unit 66 executes, on the input signal from the signal extraction unit 65, the process of canceling the conversion performed on the transmitter side, that is, the process of converting the input signal into a frequency domain signal. An output signal from the conversion cancellation unit 66 is an input signal to the demodulation unit 67.

The demodulation unit 67 demodulates the input signal from the conversion cancellation unit 66 to obtain a demodulated data signal. In a case where either of the transmitters 10 and 10a described in the first and second embodiments is the transmission source of the signal, a part of the signal is deleted in the adjustment unit 13 of the transmitter 10 or 10a. Therefore, the demodulation unit 67 performs demodulation using repetitive processing. For example, the demodulation unit 67 demodulates the reception signal by performing the repetitive processing described in the literature "D. N. Liu, M. P. Fitz, 'Iterative MAP equalization and decoding in wireless mobile coded OFDM', IEEE Trans. On Commun., vol. 57, no. 7, July 2009, pp. 2042-2051".

The transmission path estimation unit 68 performs transmission path estimation based on the fixed sequence included in the reception signal output from the reception unit 61, and outputs the estimation result to the transmission path information generation unit 71.

Figure 15:
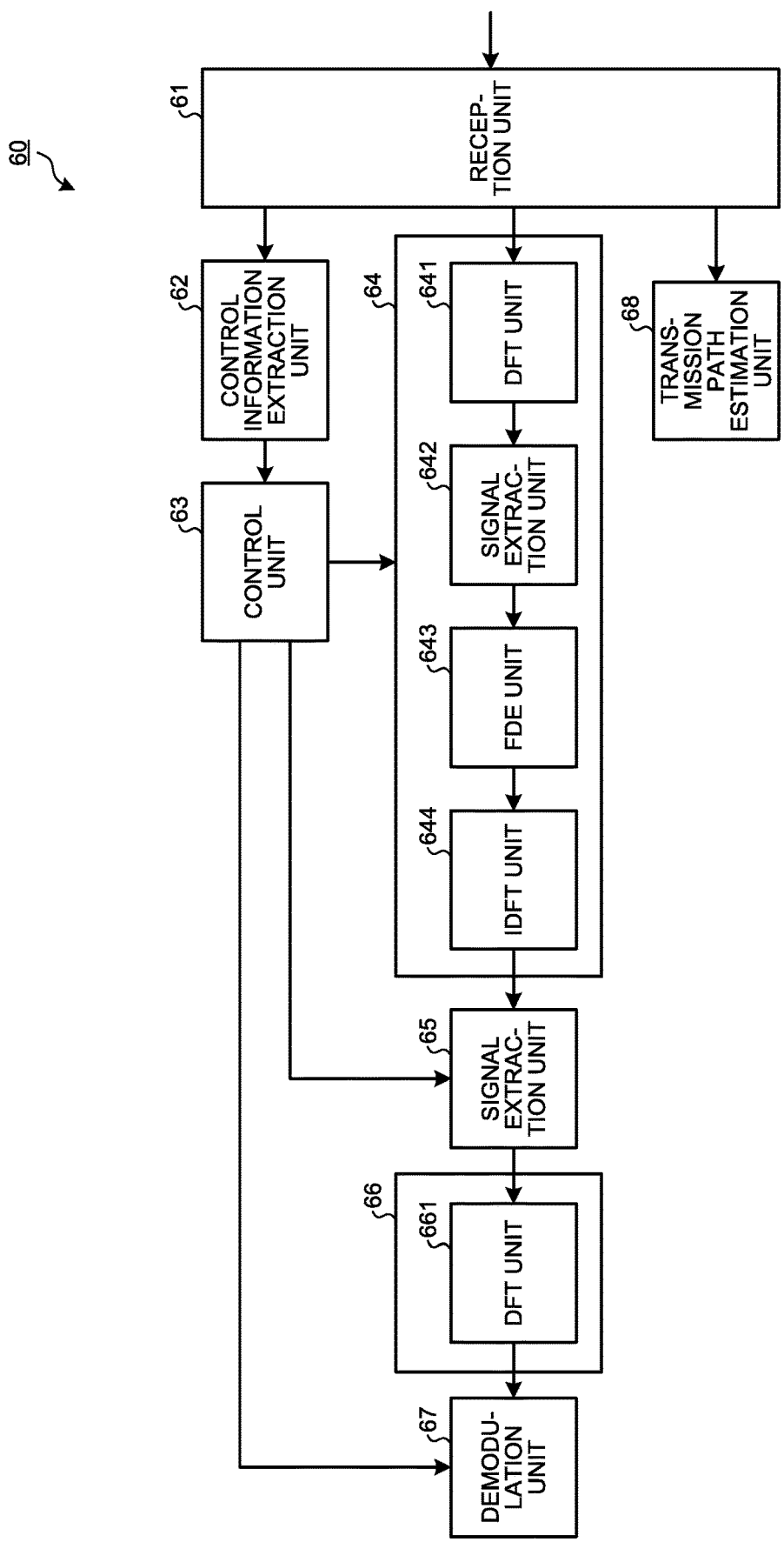
FIG. 15 is a diagram illustrating an exemplary configuration of a receiver according to the fifth embodiment.

A specific example of the signal waveform restoration unit 64 and the conversion cancellation unit 66 will be described. FIG. 15 is a diagram illustrating an exemplary configuration of the receiver 60 according to the fifth embodiment.

As illustrated in FIG. 15, the signal waveform restoration unit 64 of the receiver 60 includes a DFT unit 641, a signal extraction unit 642, a frequency domain equalizer (FDE) unit 643, and an IDFT unit 644. The conversion cancellation unit 66 of the receiver 60 includes a DFT unit 661.

The DFT unit 641 executes K-point DFT processing on the input signal to convert it into a frequency domain signal. The signal extraction unit 642 extracts, from the input signal, the signal without the zeros inserted in the interpolation processing in the transmitter 10 or 10a, that is, the data signal. The signal extraction unit 642 is notified by the control signal output from the control unit 63 of the insertion position of the signal that the signal extraction unit 642 is to extract. The FDE unit 643 performs FDE, i.e. frequency domain equalization, on the data signal extracted by the signal extraction unit 642. The FDE unit 643 performs FDE, for example, using the method described in Non Patent Literature 1 described above. The IDFT unit 644 performs N-point IDFT processing on the input signal to convert it into a time domain signal.

The DFT unit 661 performs N-point DFT processing on the input signal to convert it into a frequency domain signal.

The transmission path information generation unit 71 generates transmission path information indicating the estimation result provided by the transmission path estimation unit 68. The transmission path information is transmitted as control information from the transmission unit 72 to the base station 1 or 1a. There are multiple types of transmission path information. For example, the transmission path information may include the number of paths in the multipath transmission path, the maximum delay time, eigenvalues and eigenvectors of the transmission path matrix, candidate numbers indicating candidate precoder matrices for use in precoding on the transmission side, and the like. The transmission path information generation unit 71 generates a control signal including the transmission path information required by the base station 1 or 1a.

The transmission unit 72 performs digital-to-analog conversion processing, frequency conversion processing, and the like on the input control signal, and transmits the control signal to the base station 1 or 1a.

Figure 16:
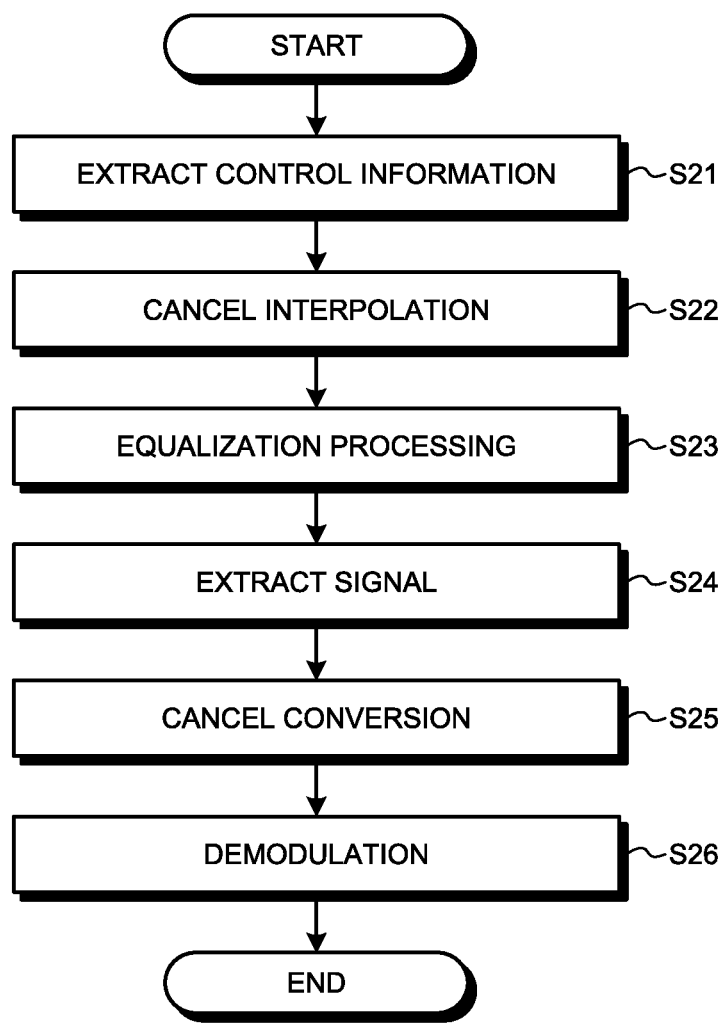
FIG. 16 is a flowchart illustrating an operation example in which the terminal according to the fifth embodiment receives a downlink signal.

Next, the operation in which the terminal 2 receives a downlink signal will be described with reference to FIG. 16. FIG. 16 is a flowchart illustrating an operation example in which the terminal 2 receives a downlink signal.

The terminal 2 first extracts control information from a reception signal (step S21). Step S21 is performed by the control information extraction unit 62.

Next, the terminal 2 executes, on the reception signal, the reverse processing of the interpolation processing performed on the transmitter side to cancel the interpolation, that is, remove the zeros inserted in the interpolation processing (step S22). The terminal 2 further executes equalization processing on the reception signal subjected to the interpolation cancellation to remove the interference component added on the multipath transmission path (step S23). Steps S22 and S23 are performed by the signal waveform restoration unit 64. Note that the signal waveform restoration unit 64 cancels the interpolation and removes the interference component in the frequency domain.

Next, the terminal 2 extracts a data signal from the reception signal (step S24), and executes the process of canceling the conversion performed by the transmitter on the data signal, specifically, the process of converting the reception signal into a frequency domain signal (step S25). Step S24 is performed by the signal extraction unit 65, and step S25 is performed by the conversion cancellation unit 66.

Next, the terminal 2 demodulates the data signal subjected to the conversion cancellation (step S26). Step S26 is performed by the demodulation unit 67.

As described above, the receiver 60 constituting the terminal 2 according to the present embodiment executes, on a reception signal, the reverse processing of the signal conversion processing, multiplex processing, interpolation processing, etc. executed by the transmitter 10 or 10*a* constituting the base station 1 or 1*a*, so that the information sequence transmitted by the downlink signal can be demodulated.

Next, the hardware configuration of the terminal 2 according to the fifth embodiment will be described. Each component of the terminal 2 can be implemented by the hardware illustrated in FIG. 6 or 7 as in the case of the base stations 1, 1*a*, 1*b*, and 1*c* described in the first to fourth embodiments. Some components of the terminal 2 may be implemented by a circuit in which a processor executes software, and the other components may be implemented by a dedicated circuit.

Sixth Embodiment

In the fifth embodiment, the terminal 2 that receives signals transmitted by the base stations 1*b* and 1*c* described in the third and fourth embodiments will be described. Note that the terminal 2 of a sixth embodiment is different from the terminal 2 of the fifth embodiment only in the configuration of the receiver. The configuration of the transmitter in the terminal 2 of the sixth embodiment is the same as that in the terminal 2 of the fifth embodiment. Therefore, in the present embodiment, the configuration and processing of the receiver will be described.

Figure 17:
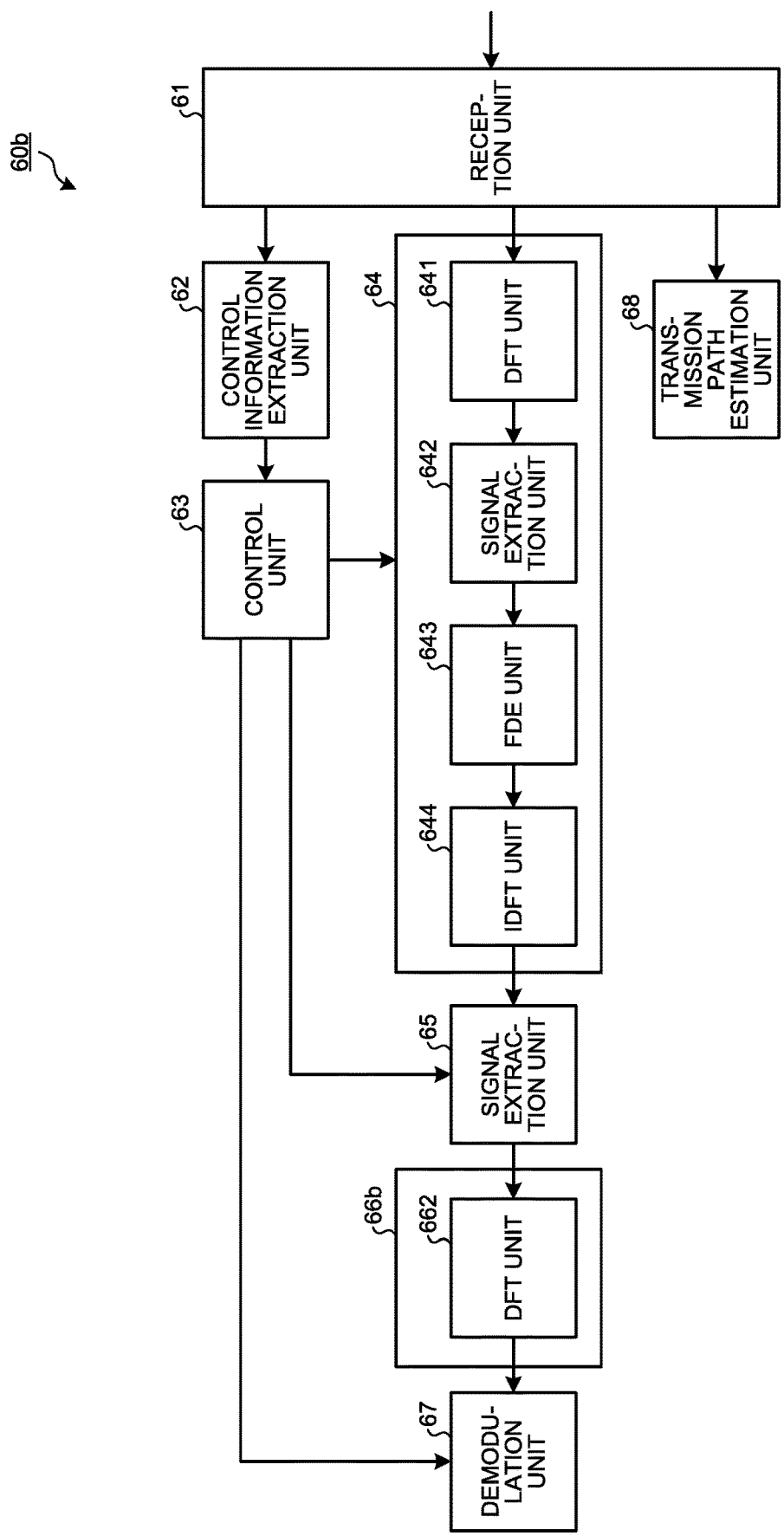
FIG. 17 is a diagram illustrating an exemplary configuration of a receiver according to a sixth embodiment.

FIG. 17 is a diagram illustrating an exemplary configuration of the receiver 60*b* according to the sixth embodiment. The receiver 60*b* is obtained by replacing the conversion cancellation unit 66 of the receiver 60 described in the fifth embodiment with a conversion cancellation unit 66*b*. The conversion cancellation unit 66*b* of the receiver 60*b* includes a DFT unit 662 that performs M-point DFT processing on the input signal to convert it into a frequency domain signal.

As described above, the receiver 60*b* constituting the terminal 2 according to the present embodiment executes, on a reception signal, the reverse processing of the signal conversion processing, multiplex processing, interpolation processing, etc. executed by the transmitter 10*b* or 10*c* constituting the base station 1*b* or 1*c*, so that the information sequence transmitted by the downlink signal can be demodulated.

Note that the receiver 60*b* according to the present embodiment can be implemented by the hardware configured as illustrated in FIG. 6 or 7 in the same manner as the receiver 60 according to the fifth embodiment.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

1, 1*a*, 1*b*, 1*c* base station; $2_1$ to $2_n$ terminal; 3 communication system; 10, 10*a*, 10*b*, 10*c*, 70 transmitter; 11 data generation unit; 12 conversion unit; 13 adjustment unit; 14, 42 fixed sequence generation unit; 15, 423 multiplexing unit; 16, 424 interpolation unit; 17, 72 transmission unit; 18, 18*b* data sequence generation unit; 20, 60, 60*b* receiver; 21, 61 reception unit; 22, 67 demodulation unit; 23 information extraction unit; 31 control information generation unit; 32, 32*a*, 63 control unit; 33 information management unit; 41 zero sequence generation unit; 43 combining unit; 62 control information extraction unit; 65, 642 signal extraction unit; 66 conversion cancellation unit; 68 transmission path estimation unit; 71 transmission path information generation unit; 121, 121*b*, 163, 243, 644 IDFT unit; 161, 241, 641 DFT unit; 162, 242 zero insertion unit; 421 fixed symbol generation unit; 422 zero symbol generation unit; 643 FDE unit.

The invention claimed is:

1. A transmitter compatible with a multicarrier block transmission scheme, the transmitter comprising:
   processing circuitry
   to generate a fixed sequence;
   to generate a data signal;
   to divide the fixed sequence into two divisions, place one of the two divisions at a head and another one of the two divisions at a tail of a block, and place a data sequence that is an output signal of the generating the data signal between the two divisions to generate a block signal; and
   to perform interpolation processing on the block signal to generate a transmission signal, wherein
   the generating the data signal includes:
   generating data symbols;
   converting the data symbols into the data signal in a time domain; and
   generating the data sequence by adjusting a length of the data signal to be equal to a difference between a length of the block signal and a length of the fixed sequence, the length being adjusted by dropping a certain number of time-domain samples from both ends of the data signal.

2. A transmitter compatible with a multicarrier block transmission scheme, the transmitter comprising:
   processing circuitry
   to generate a fixed sequence;
   to generate a data signal;
   to divide the fixed sequence into two divisions, place one of the two divisions at a head and another one of the two divisions at a tail of a block, and place a data sequence that is an output signal of the generating the data signal between the two divisions to generate a block signal; and
   to perform interpolation processing on the block signal to generate a transmission signal, wherein
   the generating the data signal includes:
   generating data symbols; and
   converting the data symbols into the data signal in a time domain having the same length as a difference between a length of the block signal and a length of the fixed sequence to generate the data sequence, the length being converted by dropping a certain number of time-domain samples from both ends of the data signal.

3. The transmitter according to claim 1, wherein
the processing circuitry generates a nonzero fixed sequence.

4. The transmitter according to claim 2, wherein
the processing circuitry generates a nonzero fixed sequence.

5. The transmitter according to claim 1, wherein
in the fixed sequence generation, a zero sequence is generated, and
the processing circuitry further including:
generating a nonzero fixed sequence and performing interpolation processing on the generated nonzero fixed sequence to generate an interpolated fixed sequence; and
combining the block signal subjected to the interpolation processing and the interpolated fixed sequence.

6. The transmitter according to claim 2, wherein
in the fixed sequence generation, a zero sequence is generated, and
the processing circuitry further including:
generating a nonzero fixed sequence and performing interpolation processing on the generated nonzero fixed sequence to generate an interpolated fixed sequence; and
combining the block signal subjected to the interpolation processing and the interpolated fixed sequence.

7. The transmitter according to claim 1, wherein
the interpolation processing includes:
converting the block signal into a frequency domain signal;
inserting zeros into the frequency domain signal; and
converting the frequency domain signal including the inserted zeros into a time domain signal.

8. The transmitter according to claim 2, wherein
the interpolation processing includes:
converting the block signal into a frequency domain signal;
inserting zeros into the frequency domain signal; and
converting the frequency domain signal including the inserted zeros into a time domain signal.

9. The transmitter according to claim 1, wherein
in the generating the fixed sequence, the fixed sequence is generated to have the length determined based on a state of a transmission path to a receiver that receives the block signal.

10. The transmitter according to claim 2, wherein
in the generating the fixed sequence, the fixed sequence is generated to have the length determined based on a state of a transmission path to a receiver that receives the block signal.

11. The transmitter according to claim 9, wherein
the state of the transmission path is a maximum value of a delay time that is added on the transmission path to a signal transmitted by the transmitter.

12. The transmitter according to claim 10, wherein
the state of the transmission path is a maximum value of a delay time that is added on the transmission path to a signal transmitted by the transmitter.

13. The transmitter according to claim 1; wherein
the two divisions of the fixed sequences which are obtained by dividing the fixed sequence into two divisions; have lengths determined based on an amount of suppression of out-of-band power of a signal transmitted by the transmitter.

14. The transmitter according to claim 2, wherein
the two divisions of the fixed sequences which are obtained by dividing the fixed sequence into two divisions, have lengths determined based on an amount of suppression of out-of-band power of a signal transmitted by the transmitter.

15. A receiver that receives a signal transmitted from the transmitter according to claim 1, the receiver comprising:
processing circuitry
to execute, on a reception signal, reverse processing of the interpolation processing, and execute frequency domain equalization on the obtained signal;
to extract the data sequence from the signal obtained using the frequency domain equalization; and
to demodulate the data sequence extracted.

16. A receiver that receives a signal transmitted from the transmitter according to claim 2, the receiver comprising:
processing circuitry
to execute, on a reception signal, reverse processing of the interpolation processing, and execute frequency domain equalization on the obtained signal;
to extract the data sequence from the signal obtained using the frequency domain equalization; and
to demodulate the data sequence extracted.

17. A communication system comprising:
a base station including the transmitter according to claim 1; and
a terminal including a receiver that receives a signal transmitted from the transmitter, the receiver including, processing circuitry configured
to execute, on a reception signal, reverse processing of the interpolation processing, and execute frequency domain equalization on the obtained signal,
to extract the data sequence from the signal obtained using the frequency domain equalization, and
to demodulate the data sequence extracted.

18. A communication system comprising:
a base station including the transmitter according to claim 2; and
a terminal including a receiver that receives a signal transmitted from the transmitter, the receiver including, processing circuitry configured
to execute, on a reception signal, reverse processing of the interpolation processing, and execute frequency domain equalization on the obtained signal,
to extract the data sequence from the signal obtained using the frequency domain equalization, and
to demodulate the data sequence extracted.

19. A transmission method that is executed by a transmitter compatible with a multicarrier block transmission scheme, the method comprising:
generating a fixed sequence;
generating a data signal;
generating a data sequence based on the data signal;
dividing the fixed sequence into two divisions, placing one of the two divisions at a head and another one of the two divisions at a tail of a block, and placing the data sequence between the two divisions to generate a block signal; and
performing interpolation processing on the block signal to generate a transmission signal, wherein
the generating the data signal includes:
generating data symbols;
converting the data symbols into the data signal in a time domain; and
adjusting a length of the data signal to be equal to a difference between a length of the block signal and a length of the fixed sequence, the length being adjusted by dropping a certain number of time-domain samples from both ends of the data signal.

20. A transmission method that is executed by a transmitter compatible with a multicarrier block transmission scheme, the method comprising:
generating a fixed sequence;
generating a data signal;
dividing the fixed sequence into two divisions, place one of the two divisions at a head and another one of the two divisions at a tail of a block, and placing a data sequence that is an output signal obtained in the data signal generation step between the two divisions to generate a block signal; and
performing interpolation processing on the block signal to generate a transmission signal, wherein
the generating the data signal includes:
generating data symbols; and
converting the data symbols into the data signal in a time domain having the same length as a difference between a length of the block signal and a length of the fixed sequence to generate the data sequence, the length being converted by dropping a certain number of time-domain samples from both ends of the data signal.

21. A transmitter compatible with a multicarrier block transmission scheme, the transmitter comprising:
processing circuitry
to generate a fixed sequence;
to convert data symbols into a time domain signal to generate a data signal;
to divide the fixed sequence into two divisions, place one of the two divisions at a head and another one of the two divisions at a tail of a block, and place a data sequence that is an output signal of the generating the data signal between the two divisions to generate a block signal; and
to perform interpolation processing on the block signal, wherein
the generating the data signal includes:
generating the data symbols;
converting the data symbols into the data signal; and
generating the data sequence for adjusting a length of the data signal to be equal to a difference between a length of the block signal and a length of the fixed sequence, wherein in the generating the fixed sequence, the fixed sequence is generated to have the length determined based on a state of a transmission path to a receiver that receives the block signal.

22. A transmitter compatible with a multicarrier block transmission scheme, the transmitter comprising:
processing circuitry
to generate a fixed sequence;
to convert data symbols into a time domain signal to generate a data signal;
to divide the fixed sequence into two divisions, place one of the two divisions at a head and another one of the two divisions at a tail of a block, and place a data sequence that is an output signal of the generating the data signal between the two divisions to generate a block signal; and
to perform interpolation processing on the block signal, wherein
the generating the data signal includes:
generating the data symbols; and
converting the data symbols into the data signal having the same length as a difference between a length of the block signal and a length of the fixed sequence to generate the data sequence, wherein
in the generating the fixed sequence, the fixed sequence is generated to have the length determined based on a state of a transmission path to a receiver that receives the block signal.

23. The transmitter according to claim 1, wherein
the data sequence is generated by replacing the dropped time-domain samples in the data signal with zeroes, and
the processing circuitry includes a multiplexer that deletes the zeroes in the data sequence and adds the two divisions of the fixed sequence to both ends of the data sequence to generate the block signal.

24. The transmitter according to claim 2, wherein
the data sequence is generated by replacing the dropped time-domain samples in the data signal with zeroes, and
the processing circuitry includes a multiplexer that deletes the zeroes in the data sequence and adds the two divisions of the fixed sequence to both ends of the data sequence to generate the block signal.

25. The transmission method according to claim 19, wherein
the data sequence is generated by replacing the dropped time-domain samples in the data signal with zeroes, and
the zeroes in the data sequence are deleted and the two divisions of the fixed sequence are added to both ends of the data sequence to generate the block signal.

26. The transmission method according to claim 20, wherein
the data sequence is generated by replacing the dropped time-domain samples in the data signal with zeroes, and
the zeroes in the data sequence are deleted and the two divisions of the fixed sequence are added to both ends of the data sequence to generate the block signal.

* * * * *